(12) United States Patent
Inoue

(10) Patent No.: US 11,302,934 B2
(45) Date of Patent: Apr. 12, 2022

(54) METHOD OF PRODUCING DUMMY CELL AND APPARATUS FOR PRODUCING DUMMY CELL

(71) Applicant: HONDA MOTOR CO., LTD., Tokyo (JP)

(72) Inventor: Daisuke Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 16/815,049

(22) Filed: Mar. 11, 2020

(65) Prior Publication Data

US 2020/0295384 A1   Sep. 17, 2020

(30) Foreign Application Priority Data

Mar. 13, 2019   (JP) .............................. JP2019-045550

(51) Int. Cl.
*H01M 8/0273* (2016.01)
*H01M 8/0258* (2016.01)
*H01M 8/04007* (2016.01)
*H01M 8/2457* (2016.01)
*H01M 8/2475* (2016.01)
*H01M 8/2404* (2016.01)
*H01M 8/242* (2016.01)

(52) U.S. Cl.
CPC ....... *H01M 8/0273* (2013.01); *H01M 8/0258* (2013.01); *H01M 8/04007* (2013.01); *H01M 8/2457* (2016.02); *H01M 8/2475* (2013.01); *H01M 8/04067* (2013.01); *H01M 8/242* (2013.01); *H01M 8/2404* (2016.02)

(58) Field of Classification Search
CPC ........... H01M 8/0273; H01M 8/04007; H01M 8/2457; H01M 8/0258; H01M 8/2475; H01M 8/2404; H01M 8/04067; H01M 8/2465; H01M 8/242; H01M 8/04253; H01M 8/0271; H01M 8/1004; H01M 8/0284; H01M 8/0286; H01M 2250/20; H01M 2008/1095
See application file for complete search history.

(56) References Cited

U.S. PATENT DOCUMENTS

| | | | |
|---|---|---|---|
| 2006/0110649 A1 | 5/2006 | Nishiyama et al. | |
| 2009/0042075 A1* | 2/2009 | Nakanishi | H01M 8/0267 429/434 |
| 2015/0064600 A1* | 3/2015 | Katsuno | B32B 37/10 429/482 |

FOREIGN PATENT DOCUMENTS

JP    4727972    7/2011

* cited by examiner

*Primary Examiner* — Matthew W Van Oudenaren
(74) *Attorney, Agent, or Firm* — Amin, Turocy & Watson, LLP

(57) ABSTRACT

In a joining method in a method of producing a dummy cell, a dummy structural body and a dummy resin frame member are stacked together into a dummy stack body in a state where an adhesive is interposed between the dummy structural body and the dummy resin frame member, and heat and pressure are applied to the dummy stack body to harden the adhesive to join components of the dummy stack body together into a single piece of the dummy stack body. In the joining step, in a state where a limitation projection is brought into contact with an outer peripheral end surface of the dummy resin frame member to limit outward deformation of the dummy resin frame member, heat and pressure are applied to the dummy stack body.

11 Claims, 15 Drawing Sheets

METHOD OF PRODUCING DUMMY CELL AND APPARATUS FOR PRODUCING DUMMY CELL

CROSS-REFERENCE TO RELATED APPLICATION

This application is based upon and claims the benefit of priority from Japanese Patent Application No. 2019-045550 filed on Mar. 13, 2019, the contents of which are incorporated herein by reference.

BACKGROUND OF THE INVENTION

Field of the Invention

The present invention relates to a method of, and an apparatus for producing a dummy cell provided at least at one end of a power generation cell stack body formed by stacking a plurality of power generation cells together in a stacking direction.

Description of the Related Art

In general, a solid polymer electrolyte fuel cell employs a solid polymer electrolyte membrane (hereinafter, also simply referred to as the electrolyte membrane). The solid polymer electrolyte membrane is a polymer ion exchange membrane. The fuel cell includes a membrane electrode assembly (MEA) including an anode provided on one surface of the electrolyte membrane, and a cathode provided on the other surface of the electrolyte membrane.

The membrane electrode assembly is sandwiched between separators to form a power generation cell, and a plurality of the power generation cells are stacked together to form a stack body. At both ends of the stack body in the stacking direction, components such as power collection terminal plates for collecting electric current generated in power generation by each of the power generation cells, and end plates for holding the power generation cells in the stacked state are provided to form a fuel cell stack.

In this regard, at ends of the stack body in the stacking direction (hereinafter also simply referred to as the ends), for example, heat dissipation is facilitated through the terminal plates, etc. Therefore, the ends of the stack body in the stacking direction tend to have low temperature in comparison with the central side of the stack body in the stacking direction. When the temperature at the ends of the stack body becomes low due to the influence of the outside temperature, etc., there is a concern that diffusion performance of the fuel gas and the oxygen-containing gas (reactant gases) becomes low, and the power generation stability of the fuel cell stack is degraded.

Under the circumstances, for example, in the fuel cell stack disclosed in Japanese Patent No. 4727972, so called a dummy cell is provided at least at one end of the stack body in the stacking direction. The dummy cell employs a metal plate instead of the electrolyte membrane. Therefore, no power generation is performed in the dummy cell, and thus, no water is produced in the dummy cell. Therefore, the dummy cell itself functions as a heat insulating layer between the terminal plate and the stack body. Thus, by providing the dummy cell as described above, it is possible to suppress decrease in the temperature at the ends of the stack body. That is, it is possible to suppress the influence of the outside temperature on the fuel cell stack, and improve the power generation stability.

SUMMARY OF THE INVENTION

The present invention has been made in relation to the technique of this type, and an object of the present invention is to provide a method of, and an apparatus for producing a dummy cell in which, at the time of joining a dummy resin frame member and a dummy structural body together, it is possible to effectively suppress deformation of the dummy resin frame member.

According to an aspect of the present invention, a method of producing a dummy cell provided at least at one end of a power generation cell stack body of a fuel cell stack in a stacking direction is provided. The fuel cell stack includes the power generation cell stack body including a plurality of power generation cells stacked in the stacking direction, the power generation cells each including a membrane electrode assembly including an electrolyte membrane and electrodes provided on both sides of the electrolyte membrane, the electrodes each having a gas diffusion layer of electrically conductive porous body, and a resin frame member provided around an outer periphery of the membrane electrode assembly, the method including the steps of a dummy structural body forming step of obtaining a dummy structural body corresponding to the membrane electrode assembly by stacking a plurality of electrically conductive porous bodies together, and a joining step of joining components of a dummy stack body together into a single piece of the dummy stack body, the dummy stack body being formed by stacking the dummy structural body and a dummy resin frame member provided around an outer periphery of the dummy structural body together in a state where an adhesive is interposed between the dummy structural body and the dummy resin frame member, the joining step being performed by applying heat and pressure to a portion of the dummy stack body where at least the adhesive is present, to harden the adhesive, wherein, in the joining step, in a state where a limitation projection is brought into contact with an outer peripheral end surface of the dummy resin frame member to limit outward deformation of the dummy resin frame member, heat and pressure are applied to the dummy stack body.

According to another aspect of the present invention, an apparatus for producing a dummy cell provided at least at one end of a power generation cell stack body of a fuel cell stack in a stacking direction is provided. The fuel cell stack includes the power generation cell stack body including a plurality of power generation cells stacked in the stacking direction, the power generation cells each including a membrane electrode assembly including an electrolyte membrane and electrodes provided on both sides of the electrolyte membrane, the electrodes each having a gas diffusion layer of electrically conductive porous body, and a resin frame member provided around an outer periphery of the membrane electrode assembly, the apparatus including a lower plate where a dummy stack body is placed, the dummy stack body including the dummy structural body and a dummy resin frame member stacked around an outer periphery of the dummy structural body in a state where an adhesive is interposed between the dummy structural body and the dummy resin frame member, the dummy structural body including a plurality of stacked electrically conductive bodies, a frame shaped upper plate, an outer peripheral portion of the dummy resin frame member being held between the lower plate and the upper plate, and a limitation projection configured to contact an outer peripheral end surface of the dummy resin frame member held between the lower plate and the upper plate to limit outward deformation of the dummy resin frame member, at time of applying heat and pressure to a portion of the dummy stack body where at least the adhesive is present by a heating and pressing mechanism, to harden the adhesive.

In the present invention, in the state where the limitation projection is brought into contact with the outer peripheral end surface of the dummy resin frame member to limit outward deformation of the dummy resin frame member, heat and pressure are applied to the dummy stack body. By joining the dummy resin frame member and the dummy structural body together in this manner, it is possible to obtain the dummy cell in which deformation of the dummy resin frame member is suppressed effectively.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

DESCRIPTION OF THE PREFERRED EMBODIMENTS

Figure 1:
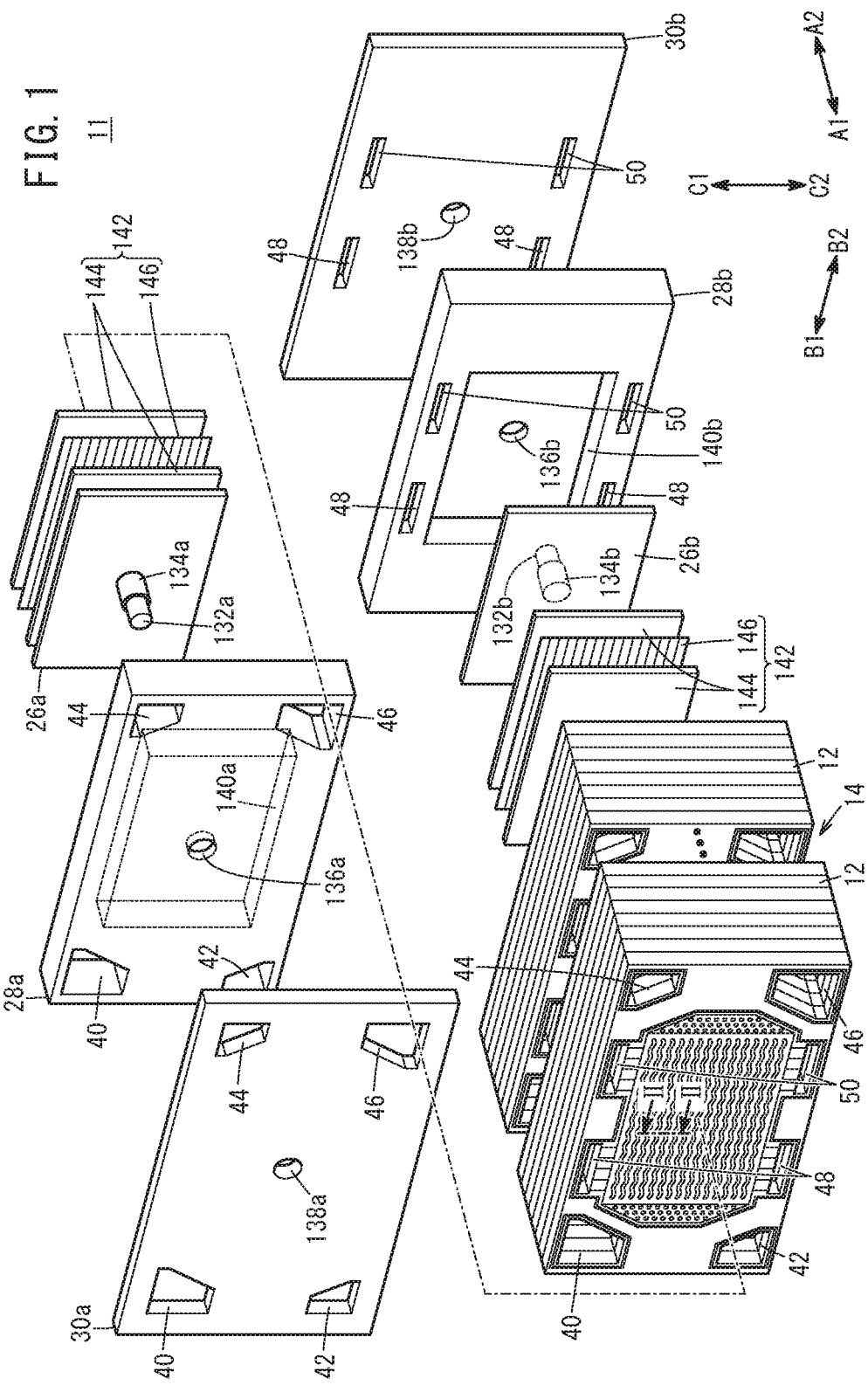
FIG. 1 is an exploded perspective view showing a fuel cell stack including dummy cells according to an embodiment of the present invention.

A preferred embodiment of a method of, and an apparatus for producing a dummy cell according to the present invention will be described in detail with reference to the accompanying drawings. In the following drawings, the constituent elements having identical or similar functions and advantages are labeled with the same reference numerals, and repeated description may be omitted.

Figure 2:
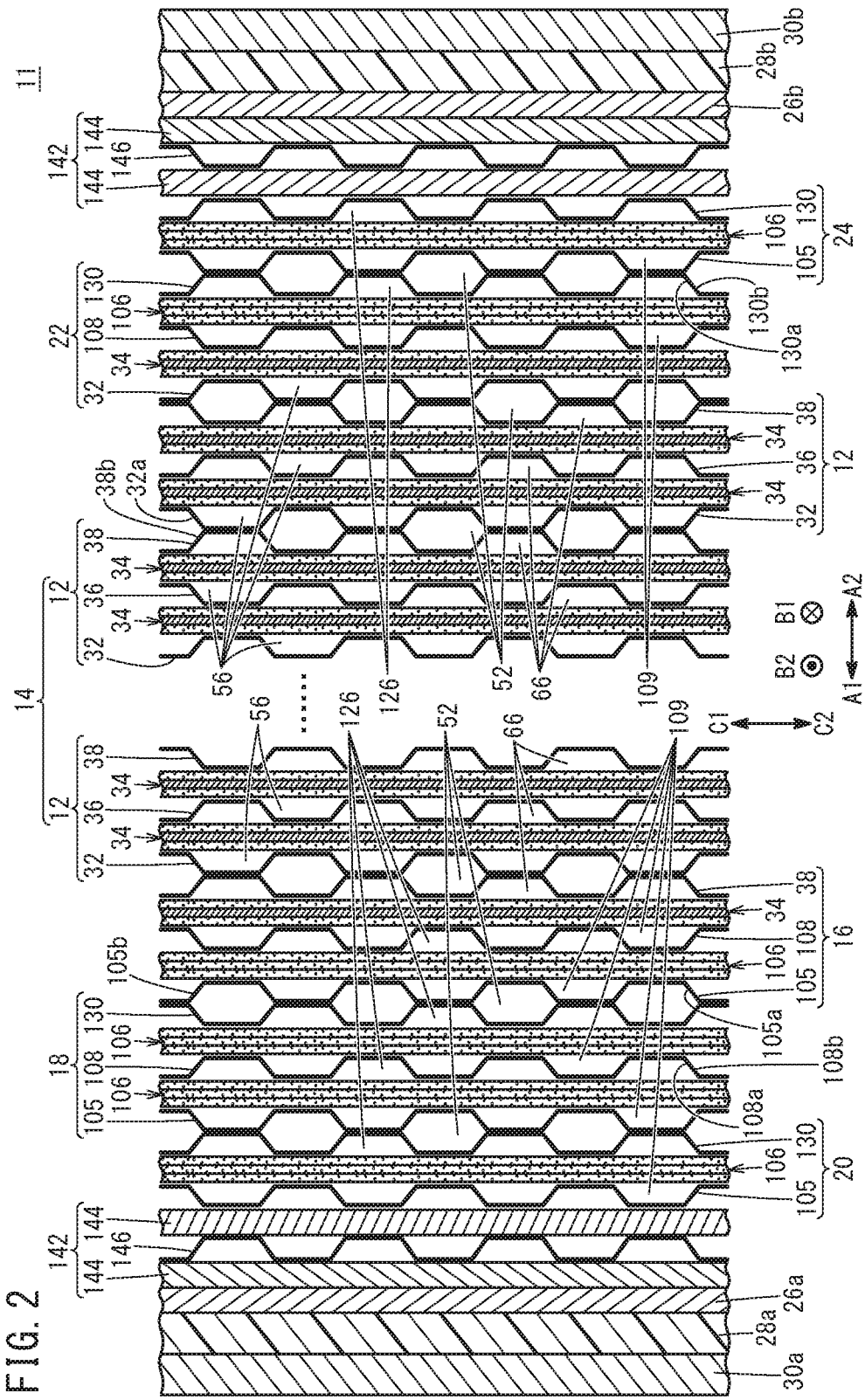
FIG. 2 is a cross sectional view taken along arrow lines II-II in FIG. 1, showing the fuel cell stack in FIG. 1.

As shown in FIGS. 1 and 2, the dummy cell obtained by applying the method of, and the apparatus 10 (see FIGS. 12 to 15) for producing the dummy cell according to the embodiment of the present invention is provided for a fuel cell stack 11. For example, the fuel cell stack 11 is mounted in a fuel cell vehicle such as a fuel cell electric automobile (not shown).

The fuel cell stack 11 includes a power generation cell stack body 14 formed by stacking a plurality of power generation cells 12 in a horizontal direction (indicated by arrows A1, A2) or in the gravity direction (indicated by arrows C1, C2). As shown in FIG. 2, at one end of the power generation cell stack body 14 in a stacking direction (indicated by the arrow A1), a first end power generation unit 16 is disposed. A first dummy cell 18 is disposed outside the first end power generation unit 16, and a second dummy cell 20 is disposed outside the first dummy cell 18. Further, at the other end of the power generation cell stack body 14 in the stacking direction (indicated by an arrow A2), a second end power generation unit 22 is disposed. A third dummy cell 24 is disposed outside the second end power generation unit 22. The first dummy cell 18, the second dummy cell 20, and the third dummy cell 24 will also be referred to as the dummy cell(s), collectively.

A terminal plate 26a is disposed outside the second dummy cell 20 of the power generation cell stack body 14 (in the direction indicated by the arrow A1). An insulator 28a is disposed outside the terminal plate 26a, and an end plate 30a is disposed outside the insulator 28a. A terminal plate 26b is disposed outside the third dummy cell 24 of the power generation cell stack body 14 (in the direction indicated by the arrow A2). An insulator 28b is disposed outside the terminal plate 26b, and an end plate 30b is disposed outside the insulator 28b.

As shown in FIG. 1, coupling bars (not shown) are disposed between respective sides of the end plates 30a, 30b having a rectangular shape. Both ends of the coupling bars are fixed to inner surfaces of the end plates 30a, 30b using bolts (not shown), and a tightening load in a stacking direction (direction indicated by the arrows A1 and A2) is applied to the plurality of power generation cells 12 that are stacked together. It should be noted that, the fuel cell stack 11 may have a casing including the end plates 30a, 30b, and the power generation cell stack body 14, etc. may be placed in the casing.

Figure 3:
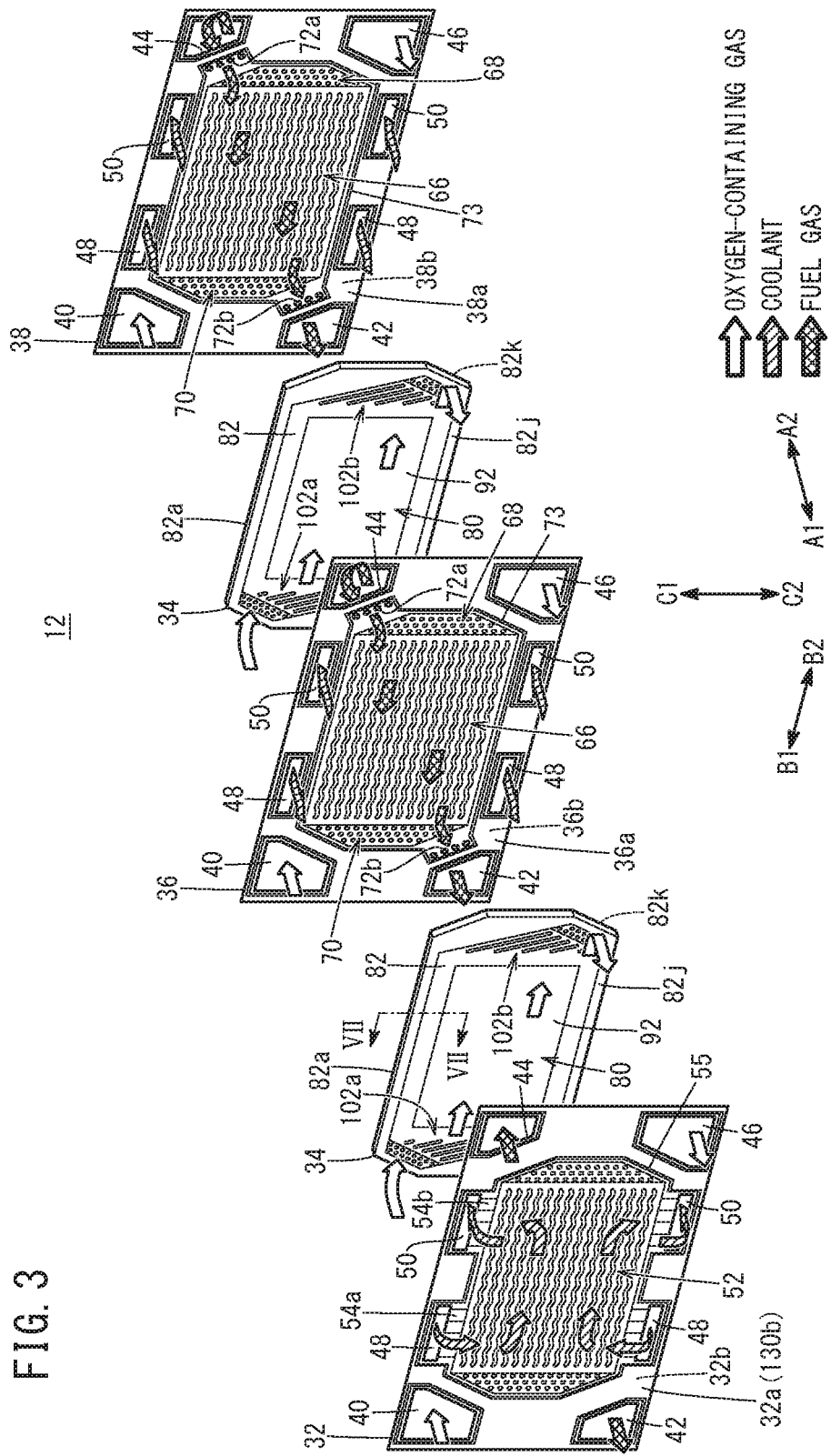
FIG. 3 is an exploded perspective view showing a power generation cell.

As shown in FIG. 3, each of the power generation cells 12 is formed by stacking a first separator 32, a resin frame equipped MEA 34, a second separator 36, a resin frame equipped MEA 34, and a third separator 38 together in this order. Each of the first separator 32, the second separator 36, and the third separator 38 (each of the separators) is formed by a steel plate, a stainless steel plate, aluminum plate, and a plated steel plate, etc., and has a rectangular flat surface. Each of the first separator 32, the second separator 36, and the third separator 38 is formed by press forming to have a corrugated shape in cross section.

As shown in FIGS. 1 and 3, at one end of each separator in a long side direction (indicated by an arrow B1), an oxygen-containing gas supply passage 40 and a fuel gas discharge passage 42 are provided. The oxygen-containing gas supply passage 40 and the fuel gas discharge passage 42 extend through each separator in the direction indicated by the arrows A1 and A2 (stacking direction). An oxygen-containing gas is supplied through the oxygen-containing gas supply passage 40. A fuel gas such as the hydrogen-containing gas is discharged through the fuel gas discharge passage 42. The oxygen-containing gas and the fuel gas are also referred to as the reactant gases, collectively.

At the other end of each separator in the long side direction (indicated by the arrow B2), a fuel gas supply passage 44 for supplying the fuel gas, and an oxygen-containing gas discharge passage 46 for discharging the oxygen-containing gas are provided. The fuel gas supply passage 44 and the oxygen-containing gas discharge passage 46 extend through each separator in the direction indicated by the arrows A1, A2. It should be noted that the oxygen-containing gas supply passage 40, the fuel gas discharge passage 42, the fuel gas supply passage 44, the oxygen-containing gas discharge passage 46 are also referred to as the reactant gas passages, collectively.

At both ends of each separator in the short side direction (direction indicated by arrows C1, C2) on one side in the direction indicated by the arrow B1, a pair of coolant supply passages 48 for supplying the coolant are provided respectively. The coolant supply passages 48 extend through each separator in the direction indicated by the arrows A1 and A2. At both ends of each separator in the short side direction on one side indicated by the arrow B2, a pair of coolant discharge passages 50 for discharging the coolant are provided, respectively. The coolant discharge passages 50 extend through each separator in the direction indicated by the arrows A1 and A2.

As shown in FIG. 3, the first separator 32 has a coolant flow field 52 on its surface 32a indicated by the arrow A1. The coolant flow field 52 is connected to the coolant supply passages 48 and the coolant discharge passages 50. A plurality of inlet connection grooves 54a are formed between the coolant supply passages 48 and the coolant flow field 52. A plurality of outlet connection grooves 54b are formed between the coolant flow field 52 and the coolant discharge passages 50. Further, a seal member 55 is formed on the surface 32a of the first separator 32. The seal member 55 is provided around all of the coolant supply passage 48, the coolant discharge passage 50, the coolant flow field 52, the inlet connection grooves 54a, the outlet connection grooves 54b to provide sealing between the inside and the outside of the seal member 55 in the surface direction.

Figure 4:
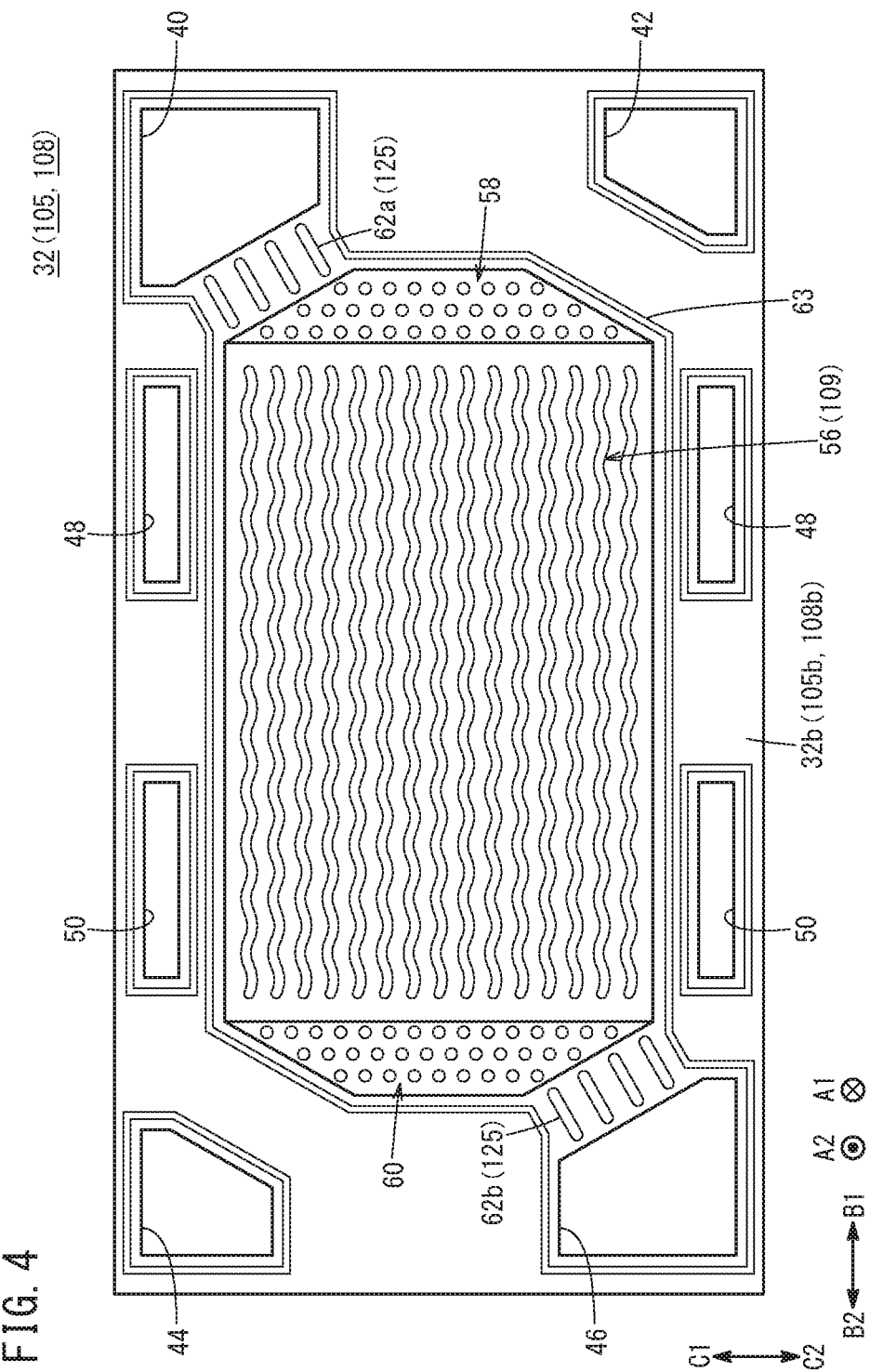
FIG. 4 is a front view of a first separator showing a side where an oxygen-containing gas flow field is present.

As shown in FIG. 4, the first separator 32 has an oxygen-containing gas flow field 56 on its surface 32b indicated by the arrow A2. The oxygen-containing gas flow field 56 is connected to the oxygen-containing gas supply passage 40 and the oxygen-containing gas discharge passage 46. The oxygen-containing gas flow field 56 includes a plurality of wavy flow grooves (or straight flow grooves) arranged in parallel to each other.

An oxygen-containing gas inlet buffer 58 positioned outside the power generation area is connected to an inlet end of the oxygen-containing gas flow field 56, and an oxygen-containing gas outlet buffer 60 positioned outside the power generation area is connected to an outlet end of the oxygen-containing gas flow field 56.

A plurality of inlet connection grooves 62a are formed between the oxygen-containing gas inlet buffer 58 and an oxygen-containing gas supply passage 40. A plurality of outlet connection grooves 62b are formed between the oxygen-containing gas outlet buffer 60 and the oxygen-containing gas discharge passage 46. A seal member 63 is formed on the surface 32b of the first separator 32. The seal member 63 is provided around all of the oxygen-containing gas supply passage 40, the oxygen-containing gas discharge passage 46, the oxygen-containing gas flow field 56, the oxygen-containing gas inlet buffer 58, the oxygen-containing gas outlet buffer 60, the inlet connection grooves 62a, and the outlet connection grooves 62b to provide sealing between the inside the outside of the seal member 63 in the surface direction. In the first separator 32, the back surface of the oxygen-containing gas flow field 56 forms part of the coolant flow field 52 (see FIGS. 2 and 3).

As shown in FIG. 3, the second separator 36 has a fuel gas flow field 66 on its surface 36a indicated by an arrow A1. The fuel gas flow field 66 is connected to the fuel gas supply passage 44 and the fuel gas discharge passage 42. The fuel gas flow field 66 includes a plurality of wavy flow grooves (or straight flow grooves) arranged in parallel to each other.

A fuel gas inlet buffer 68 positioned outside the power generation area is connected to an inlet end of the fuel gas flow field 66, and a fuel gas outlet buffer 70 positioned outside the power generation area is connected to an outlet end of the fuel gas flow field 66. A plurality of fuel gas supply holes 72a are provided between the fuel gas inlet buffer 68 and the fuel gas supply passage 44. The fuel gas supply holes 72a penetrate through the second separator 36 in the thickness direction. A plurality of fuel gas discharge holes 72b are provided between the fuel gas outlet buffer 70 and the fuel gas discharge passage 42. The fuel gas discharge holes 72b penetrate through the second separator 36 in the thickness direction.

A seal member 73 is formed on the surface 36a of the second separator 36. The seal member 73 is provided around all of the fuel gas flow field 66, the fuel gas inlet buffer 68, the fuel gas outlet buffer 70, the fuel gas supply holes 72a, and the fuel gas discharge holes 72b to provide sealing between the inside and outside of the seal member 73 in the surface direction.

Figure 5:
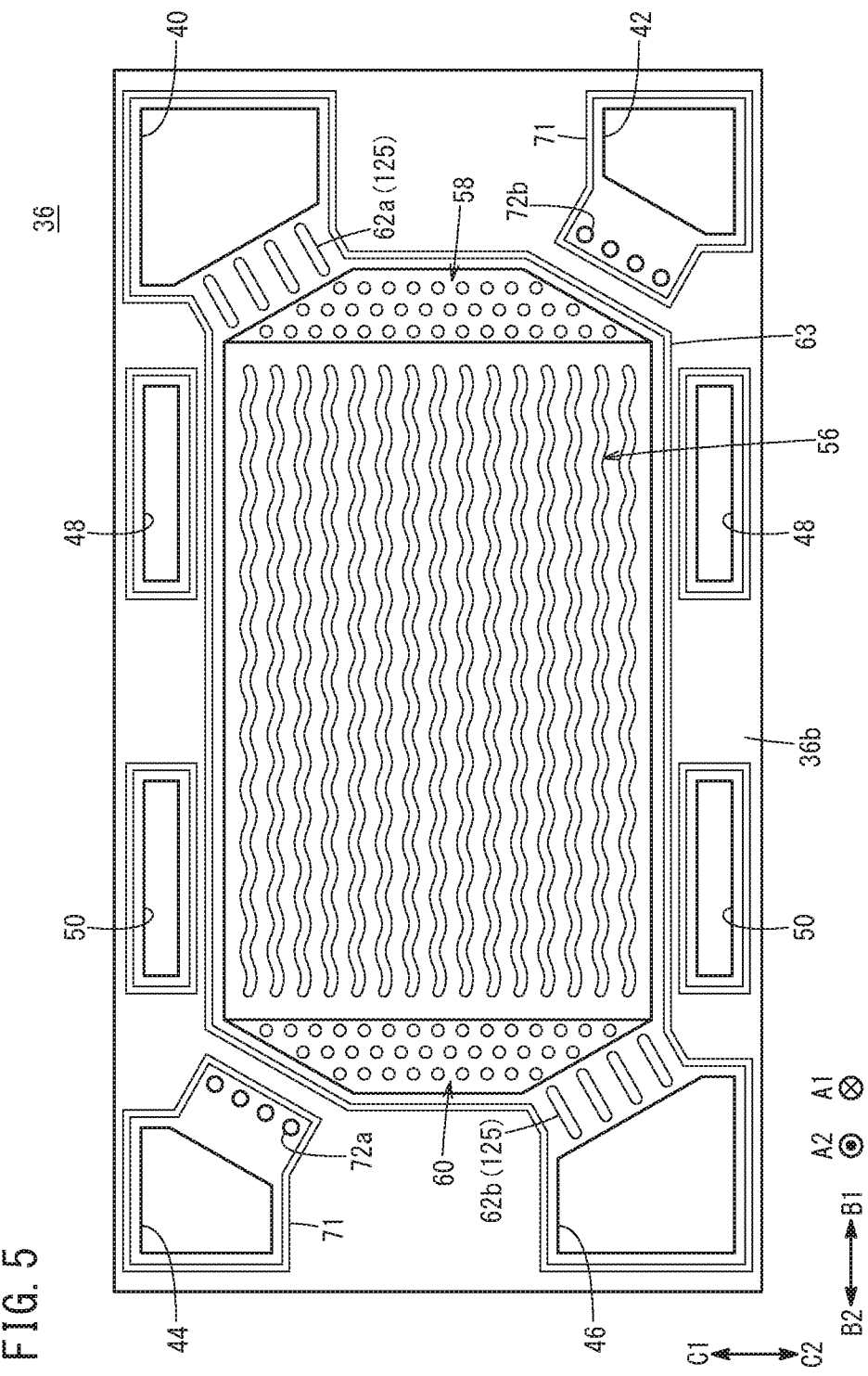
FIG. 5 is a front view of a second separator showing a side where the oxygen-containing gas flow field is present.

As shown in FIG. 5, a surface 36b of the second separator 36 on the side in the direction indicated by the arrow A2 has the same structure as the surface 32b of the first separator 32 on the side in the direction indicated by the arrow A2 except that fuel gas supply holes 72a and fuel gas discharge holes 72b surrounded by a seal member 71 are provided (see FIG. 4). That is, the oxygen-containing gas flow field 56 is provided on the surface 36b of the second separator 36. The oxygen-containing gas flow field 56 is connected to the oxygen-containing gas supply passage 40 and the oxygen-containing gas discharge passage 46. Further, an oxygen-containing gas inlet buffer 58, an oxygen-containing gas outlet buffer 60, inlet connection grooves 62a, outlet connection grooves 62b, and the seal member 63 are formed on the surface 36b of the second separator 36.

On the surface 36b of the second separator 36, each of the fuel gas supply holes 72a and the fuel gas discharge holes 72b is disconnected from the oxygen-containing gas inlet buffer 58 and the oxygen-containing gas outlet buffer 60 by the seal members 63, 71.

As shown in FIG. 3, a surface 38a of the third separator 38 on the side indicated by the arrow A1 may have the same structure as the surface 36a of the second separator 36 on the side indicated by the arrow A1. That is, the fuel gas flow field 66 connected to the fuel gas supply passage 44 and the fuel gas discharge passage 42 is provided on the surface 38a of the third separator 38. Further, the fuel gas inlet buffer 68, the fuel gas outlet buffer 70, the fuel gas supply holes 72a, the fuel gas discharge holes 72b, and the seal member 73 are formed on the surface 38a of the third separator 38.

Figure 6:
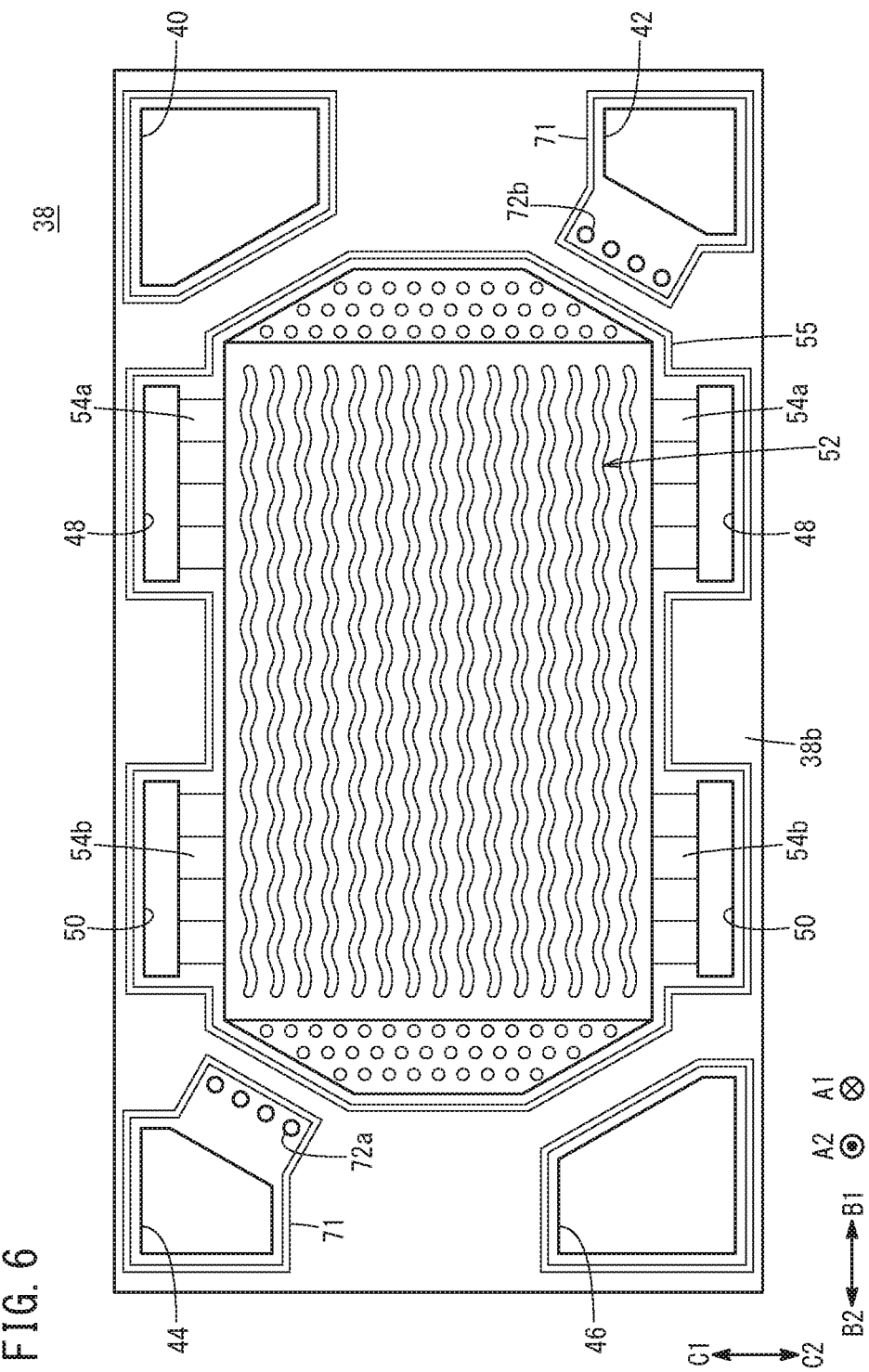
FIG. 6 is a front view of a third separator showing a side where a coolant flow field is present.

As shown in FIG. 6, a surface 38b of the third separator 38 on the side indicated by the arrow A2 has the same structure as the surface 32a of the first separator 32 on the side in the direction indicated by the arrow A1 except that the fuel gas supply holes 72a and the fuel gas discharge holes 72b surrounded by the seal member 71 are provided (see FIG. 3). That is, the coolant flow field 52, the inlet connection grooves 54a, the outlet connection grooves 54b, and the seal member 55 are provided on the surface 38b of the third separator 38. On the surface 38b of the third separator 38, each of the fuel gas supply holes 72a, and the fuel gas discharge holes 72b is disconnected from the coolant flow field 52, the inlet connection grooves 54a, the outlet connection grooves 54b, etc. by the seal members 55, 71.

As shown in FIG. 2, the coolant flow field 52 on the surface 38b of the third separator 38 indicated by the arrow A2 and the coolant flow field 52 on the surface 32a of the first separator 32 in the direction indicated by the arrow A1 face each other, and the coolant can flow inside the coolant flow field 52.

As shown in FIGS. 3, 5, and 6, in the second separator 36 and the third separator 38, since the seal members 71, 73 are provided as described above, the fuel gas flowing from the fuel gas supply passage 44 from the side indicated by the arrow A1 to the side indicated by the arrow A2 flows through the fuel gas supply holes 72a from the side indicated by the arrow A2 to the side indicated by the arrow A1, and flows into the fuel gas inlet buffer 68 and the fuel gas flow field 66. Further, after the fuel gas flowed through the fuel gas flow field 66, and flowed into the fuel gas outlet buffer 70, the fuel gas flows through the fuel gas discharge holes 72b from the side indicated by the arrow A1 to the side indicated by the arrow A2, and then, the fuel gas flows through the fuel gas discharge passage 42 from the side indicated by the arrow A2 to the side indicated by the arrow A1. Seal members made of elastic material (not shown) provided around the outer peripheral ends of the separators are formed integrally with both surfaces of the separators, respectively.

Figure 7:
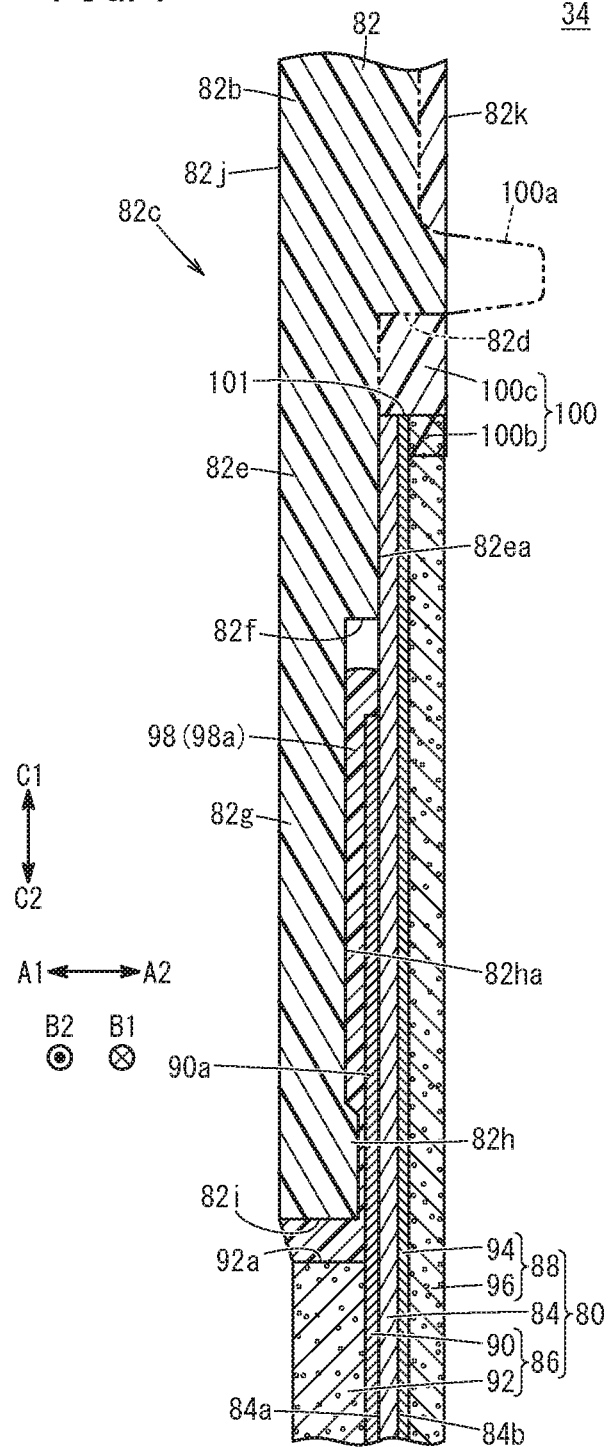
FIG. 7 is a cross sectional view taken along arrow lines VII-VII in FIG. 3.

As shown in FIGS. 3 and 7, the resin frame equipped MEA 34 is formed by joining a resin frame member 82 onto the peripheral portion of a membrane electrode assembly (MEA) 80. As shown in FIG. 7, the membrane electrode assembly 80 includes a solid polymer electrolyte membrane (hereinafter also simply referred to as the electrolyte membrane) 84 which is a thin membrane of perfluorosulfonic acid containing water. A fluorine based electrolyte may be used as the electrolyte membrane 84. Alternatively, an HC (hydrocarbon) based electrolyte may be used for the electrolyte membrane 84. The electrolyte membrane 84 is interposed between a cathode 86 and an anode 88.

The membrane electrode assembly 80 forms an MEA having different sizes of components where the surface size of the cathode 86 is smaller than the surface sizes of the anode 88 and the electrolyte membrane 84. It should be noted that the cathode 86, the anode 88, and the electrolyte membrane 84 may have the same size. Further, the surface size of the anode 88 may be smaller than the surface sizes of the cathode 86 and the electrolyte membrane 84.

The cathode 86 includes a first electrode catalyst layer 90 joined to a surface 84a at one end of the electrolyte membrane 84 (side indicated by the arrow A1), and a first gas diffusion layer 92 stacked on the first electrode catalyst layer 90. The surface size of the first electrode catalyst layer 90 is larger than the surface size of the first gas diffusion layer 92, and includes an outer peripheral exposed portion 90a protruding from an outer peripheral end surface 92a of the first gas diffusion layer 92. Further, the surface size of the first electrode catalyst layer 90 is smaller than the surface size of the electrolyte membrane 84.

The anode 88 includes a second electrode catalyst layer 94 joined to a surface 84b at the other end (side indicated by the arrow A2) of the electrolyte membrane 84, and a second gas diffusion layer 96 stacked on the second electrode catalyst layer 94. The surfaces sizes the second electrode catalyst layer 94 and the second gas diffusion layer 96 are the same, and the same as (or smaller than) the surface size of the electrolyte membrane 84.

For example, the first electrode catalyst layer 90 is formed by porous carbon particles deposited uniformly on the surface of the first gas diffusion layer 92 together with an ion conductive polymer binder and platinum alloy supported on the porous carbon particles. The second electrode catalyst layer 94 is formed by porous carbon particles deposited uniformly on the surface of the second gas diffusion layer 96 together with an ion conductive polymer binder and platinum alloy supported on the porous carbon particles.

Each of the first gas diffusion layer 92 and the second gas diffusion layer 96 is formed of an electrically conductive porous body such as carbon paper or carbon cloth, etc. The surface size of the second gas diffusion layer 96 is larger than the surface size of the first gas diffusion layer 92.

For example, the resin frame member 82 is made of resin material such as PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. For example, this resin material may be in the form of a film, etc. having the uniform thickness.

As shown in FIG. 3, the resin frame member 82 has a frame shape, and is provided inside a fluid passage group made up of the fluid passages 40, 42, 44, 46, 48, 50 including the oxygen-containing gas supply passage 40, and the fluid passages 40, 42, 44, 46, 48, 50 are not formed in the resin frame member 82. Further, as shown in FIG. 7, the resin frame member 82 has an outer peripheral frame 82b provided over a predetermined length inside an outer peripheral end surface 82a (see FIG. 3), and an inner expansion 82c provided inside the inner peripheral portion of the outer peripheral frame 82b.

The inner expansion 82c includes a shelf portion 82e extending inward from the inner peripheral portion of the outer peripheral frame 82b through a first stepped surface 82d, and a thin portion 82g extending inward from the inner peripheral portion of the shelf portion 82e through a second stepped surface 82f. The shelf portion 82e is thinner than the outer peripheral frame 82b, and the thin portion 82g is thinner than the shelf portion 82e. Further, the first stepped surface 82d, the shelf portion 82e, the second stepped surface 82f, and the thin portion 82g are provided over the entire periphery of the resin frame member 82. An outer peripheral portion of the surface 84a of the electrolyte membrane 84 contacts a surface 82ea of the shelf portion 82e on the side indicated by the arrow A2. A bank 82h facing an outer peripheral exposed portion 90a of the first electrode catalyst layer 90 is provided over the entire periphery of the inner peripheral portion of the thin portion 82g. Further, a groove 82ha is provided between the bank 82h and the second stepped surface 82f, of the thin portion 82g.

A portion of the surface 84a of the electrolyte membrane 84 positioned close to the groove 82ha and the outer peripheral exposed portion 90a of the first electrode catalyst layer 90 are provided with an adhesion portion 98 formed by hardening a power generation cell adhesive 98a filled around the outer peripheral exposed portion 90a. This adhesion portion 98 is also filled between an inner peripheral end surface 82i of the resin frame member 82 and the outer peripheral end surface 92a of the first gas diffusion layer 92. Preferably, the power generation cell adhesive 98a is thermosetting resin in light of excellent heat resistance and easy hardening, etc. However, the power generation cell adhesive 98a need not necessarily be limited to thermosetting resin specially. Examples of resin which can be used as the power generation cell adhesive 98a include fluorine resin based material, silicone resin based material, and epoxy resin based material in liquid or solid form.

The resin frame member 82 and the outer peripheral portion of the second gas diffusion layer 96 are joined together by a joint portion 100 using adhesive resin. The joint portion 100 is provided around the outer peripheral portion of the second gas diffusion layer 96. As shown in FIG. 7, for example, the joint portion 100 is formed by thermally deforming a resin projection 100a which is formed integrally with the resin frame member 82 in a manner that the resin projection 100a is provided around the inner end of the outer peripheral frame 82b and protruding in a direction indicated by the arrow A2. This joint portion 100 is formed by a resin impregnation portion 100b and a first melted and solidified portion 100c.

The resin impregnation portion 100b is formed by impregnating the outer peripheral portion of the second gas diffusion layer 96 with melted resin formed by melting the resin projection 100a. The first melted and solidified portion 100c is formed by allowing the melted resin formed by melting the resin projection 100a to flow between the first stepped surface 82d of the resin frame member 82, and an outer end surface 101 of both the electrolyte membrane 84 and the anode 88, which are disposed at a distance from each other, and solidifying the melted resin.

By providing the adhesion portion 98 around the outer peripheral exposed portion 90a of the first electrode catalyst layer 90 and the outer peripheral end surface 92a of the first gas diffusion layer 92, and providing the joint portion 100 around the outer peripheral portion of the second gas diffusion layer 96, cross leakage, etc. between the cathode 86 and the anode 88 is prevented.

As shown in FIG. 3, an oxygen-containing gas inlet buffer 102a and an oxygen-containing gas outlet buffer 102b are provided on a surface 82j of the resin frame member 82 facing the cathode 86 (side indicated by the arrow A1). A fuel gas inlet buffer 104a and a fuel gas outlet buffet 104b (see FIG. 8 for both of the fuel gas inlet buffer 104a and the fuel gas outlet buffer 104b) are provided on a surface 82k of the resin frame member 82 facing the anode 88 (side indicated by the arrow A2).

As shown in FIG. 2, the first end power generation unit 16 is formed by stacking, from the side indicated by the arrow A1 toward the side indicated by the arrow A2, a dummy first separator 105, a resin frame equipped dummy structural body 106, a dummy second separator 108, the resin frame equipped MEA 34, and the third separator 38 in this order.

As shown in FIGS. 2 to 4, the dummy first separator 105 has the same structure as the first separator 32. The coolant flow field 52 (see FIG. 3) is provided on a surface 105a at one end of the dummy first separator 105 (side indicated by the arrow A1). Further, as shown in FIG. 2, a first space 109 corresponding to the oxygen-containing gas flow field 56 is provided between a surface 105b at the other end of the dummy first separator 105 (indicated by the arrow A2) and one end of the resin frame equipped dummy structural body 106 (indicated by the arrow A1). As shown in FIG. 4, the first space 109 is connected to the oxygen-containing gas supply passage 40 and the oxygen-containing gas discharge passage 46 through a connection channel 125 formed between the inlet connection grooves 62a and the outlet connection grooves 62b. Therefore, the oxygen-containing gas flows through the first space 109 as in the oxygen-containing gas flow field 56.

Figure 8:
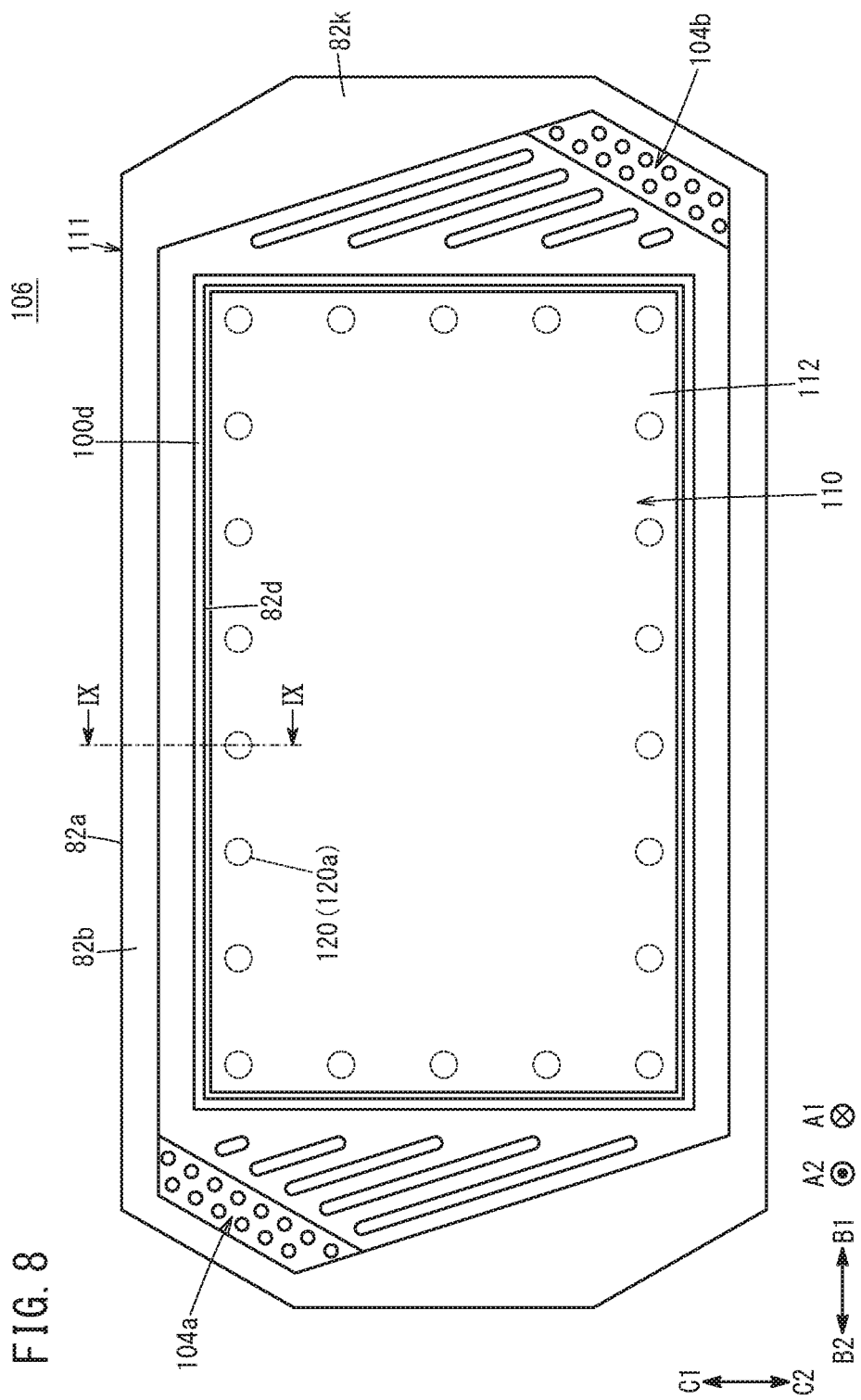
FIG. 8 is a front view of a resin frame equipped dummy structural body showing a side where a first electrically conductive porous body is present.
Figure 9:
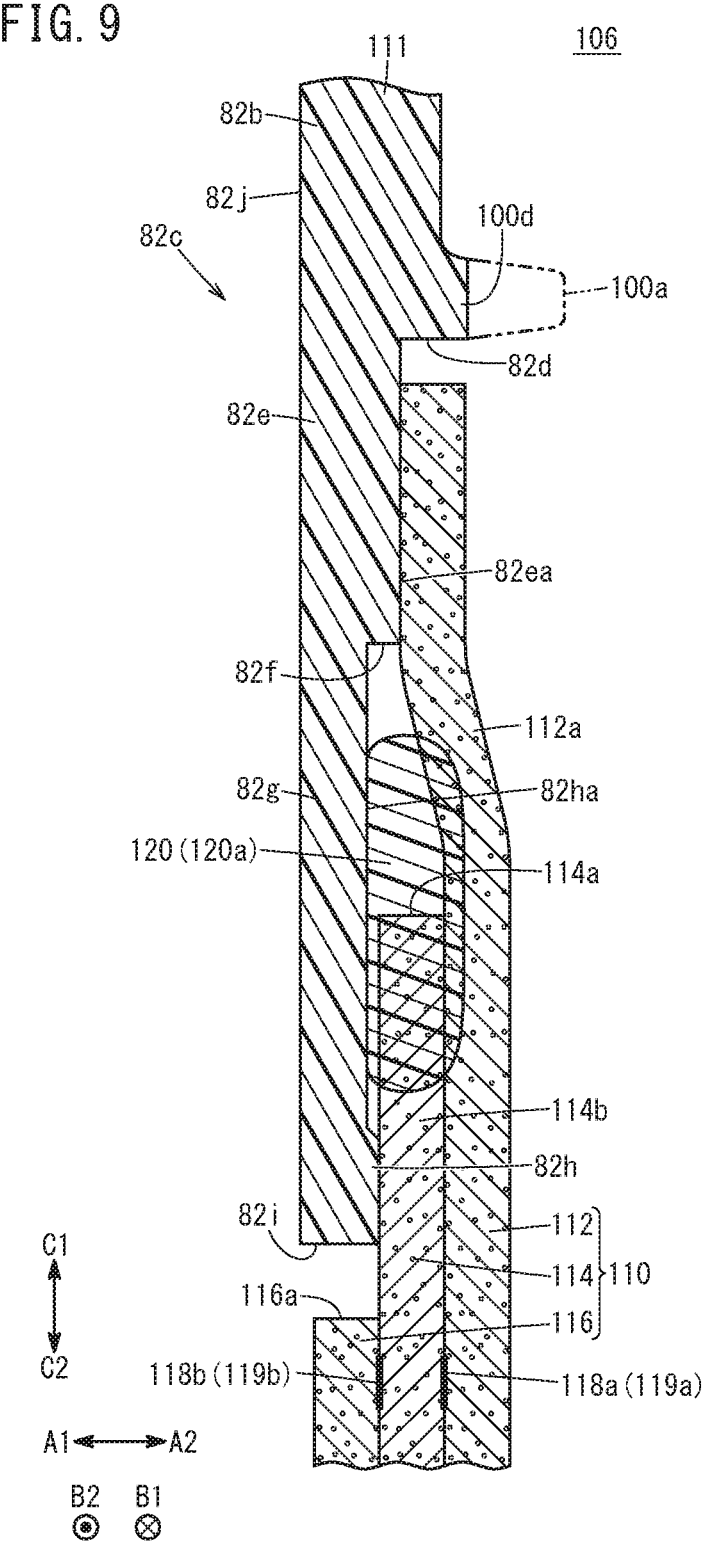
FIG. 9 is a cross sectional view taken along arrow lines IX-IX in FIG. 8.
Figure 10:
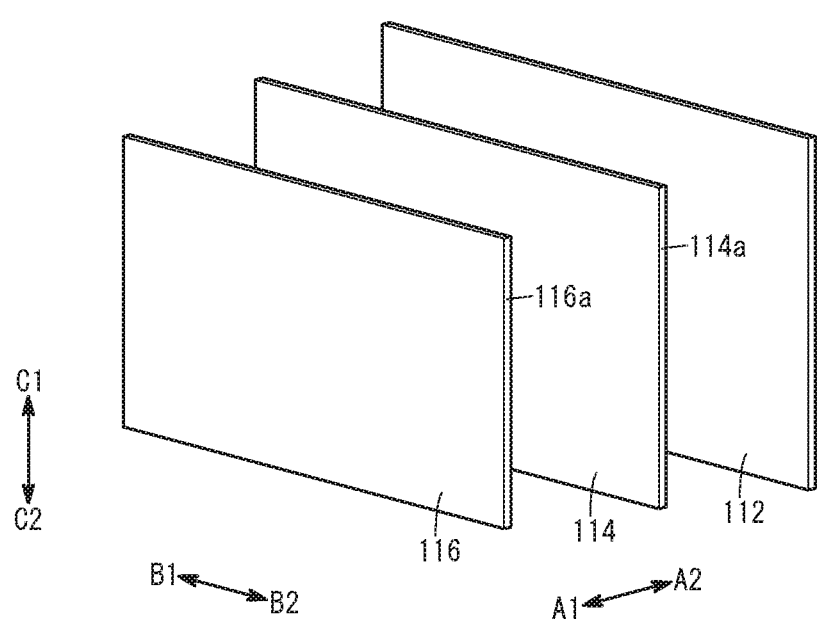
FIG. 10 is an exploded perspective view showing a dummy structural body.

As shown in FIGS. 8 and 9, the resin frame equipped dummy structural body 106 is formed by joining a dummy resin frame member 111 to outer periphery of a dummy structural body 110. As shown in FIGS. 9 and 10, the dummy structural body 110 is formed by stacking, from the side indicated by the arrow A2 toward the side indicated by the arrow A1, three electrically conductive bodies, i.e., a first electrically conductive porous body 112, a second electrically conductive porous body 114, and a third electrically conductive porous body 116 each having a different surface size (surface area/outer size), in this order. The relationship of the surface size is: the first electrically conductive porous body 112>the second electrically conductive porous body 114>the third electrically conductive porous body 116.

Therefore, as shown in FIG. 9, a first outer peripheral portion 112a extending outside an outer peripheral end surface 114a of the second electrically conductive porous body 114 is provided over the entire periphery of the outer peripheral side of the first electrically conductive porous body 112. A second outer peripheral portion 114b extending outside an outer peripheral end surface 116a of the third electrically conductive porous body 116 is provided over the entire periphery of the outer peripheral side of the second electrically conductive porous body 114.

The first electrically conductive porous body 112, the second electrically conductive porous body 114, and the third electrically conductive porous body 116 are made of the same material, and may be formed by using the same material as the electrically conductive porous body of the first gas diffusion layer 92 or the second gas diffusion layer 96.

Further, in the embodiment of the present invention, each of the first electrically conductive porous body 112, the second electrically conductive porous body 114, and the third electrically conductive porous body 116 has the same thickness as the electrically conductive porous body of the second gas diffusion layer 96. Therefore, by adjusting the surface size of the electrically conductive porous body as described above, it is possible to obtain the dummy structural body 110 more easily.

As shown in FIG. 9, the first electrically conductive porous body 112 and the second electrically conductive porous body 114 that are stacked together are joined by an adhesive layer 118a in the form of spots interposed between the first electrically conductive porous body 112 and the second electrically conductive porous body 114. The second electrically conductive porous body 114 and the third electrically conductive porous body 116 that are stacked together are joined by an adhesive layer 118b in the form of spots interposed between the second electrically conductive porous body 114 and the third electrically conductive porous body 116. The adhesive layers 118a, 118b in the form of spots are formed by hardening adhesives 119a, 119b formed discontinuously in the peripheral direction of the dummy structural body 110, respectively. Various types of adhesives may be adopted as the adhesive 119a and the adhesive 119b in the form of spots as in the case of the power generation cell adhesive 98a.

The dummy resin frame member 111 may be made of the same material (not shown) as the material used in the resin frame member 82 of the resin frame equipped MEA 34 shown in FIGS. 3 and 7. That is, by removing a resin projection 100a of the resin frame member 82 by machining, etc. without thermally deforming the resin projection 100a as described above, it is possible to form the dummy resin frame member 111. Therefore, in the dummy resin frame member 111 and the dummy structural body 110, the above described joint portion 100 is not provided. The resin frame equipped dummy structural body 106 is formed by joining the dummy resin frame member 111 and the dummy structural body 110 together using an adhesive layer 120 instead of using the joint portion 100.

Specifically, as shown in FIG. 9, the dummy resin frame member 111 includes the outer peripheral frame 82b, the inner expansion 82c, and a remaining portion 100d formed after removing the front end of the resin projection 100a. It should be noted that, in the dummy resin frame member 111, the entire resin projection 100a may be removed. In this case, the remaining portion 100d is not formed.

The first outer peripheral portion 112a of the first electrically conductive porous body 112 and the second outer peripheral portion 114b of the second electrically conductive porous body 114 are positioned close to the inner periphery of the dummy resin frame member 111. That is, the shelf portion 82e of the inner expansion 82c contacts the side of the first outer peripheral portion 112a indicated by the arrow A1. The part of the first outer peripheral portion 112a on the side indicated by the arrow A1 and the part of the second outer peripheral portion 114b on the side indicated by the arrow A1 are positioned close to the thin portion 82g. The protruding end surface of the bank 82h contacts a portion of the second outer peripheral portion 114b on the side indicated by the arrow A1.

In the direction indicated by the arrows A1, A2, the outer peripheral end surface 114a of the second electrically conductive porous body 114 is disposed between the first electrically conductive porous body 112 and the thin portion 82g. In the surface direction of the dummy structural body 110 (in the directions indicated by the arrows B1, B2, C1, C2), the inner peripheral end surface 82i of the dummy resin frame member 111 is positioned between the outer peripheral end surface 114a of the second electrically conductive porous body 114 and the outer peripheral end surface 116a of the third electrically conductive porous body 116. The outer peripheral end surface 116a of the third electrically conductive porous body 116 is positioned close to the inner peripheral end surface 82i of the dummy resin frame member 111 at a distance. The thickness of the second electrically conductive porous body 114 is larger than the height of the second stepped surface 82f.

The adhesive layer 120 is at least provided between the second electrically conductive porous body 114 of the dummy structural body 110 and the groove 82ha of the dummy resin frame member 111. In the embodiment of the present invention, the adhesive layer 120 is provided in a manner that, in the surface direction of the dummy structural body 110, the adhesive layer 120 extends toward inside and outside from the outer peripheral end surface 114a of the second electrically conductive porous body 114. The first outer peripheral portion 112a and the second outer peripheral portion 114b are adhered to the inner periphery of the dummy resin frame member 111 by this adhesive layer 120.

Further, in the stacking direction (direction indicated by the arrows A1 and A2, thickness direction) of the dummy structural body 110, the adhesive layer 120 is formed by hardening an adhesive 120a impregnated into the entire second electrically conductive porous body 114 and part of the first electrically conductive porous body 112 positioned close to the second electrically conductive porous body 114 (the side indicated by the arrow A1). That is, the adhesive layer 120 is formed by hardening thermosetting resin.

As shown in FIG. 8, the adhesive layer 120 is provided discontinuously (in the form of spots) in the peripheral direction of the second outer peripheral portion 114b of the dummy structural body 110. However, the adhesive layer 120 may be provided around the second outer peripheral portion 114b continuously.

Figure 11:
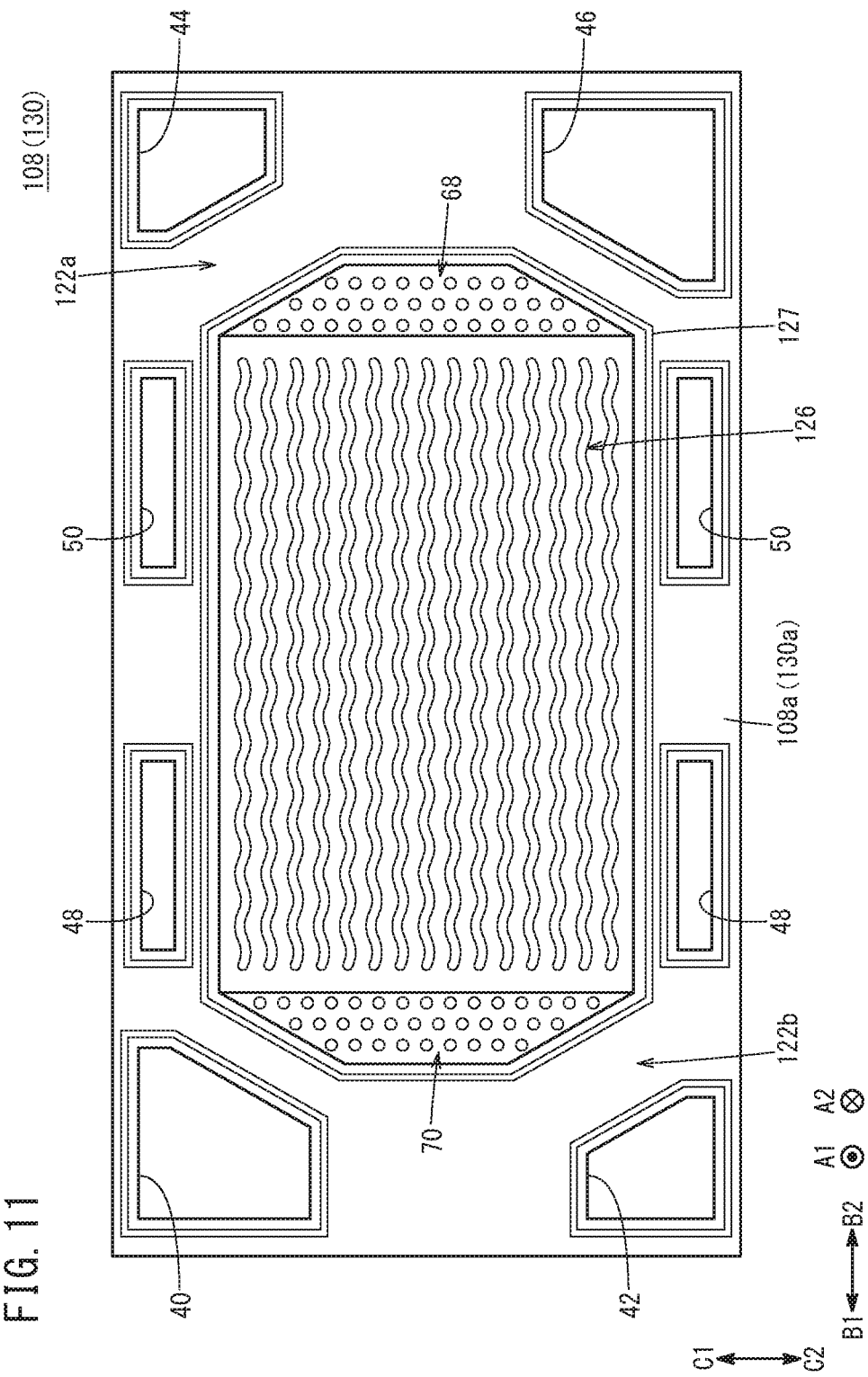
FIG. 11 is a front view of a dummy second separator showing a side where a second space is present.

As shown in FIG. 11, the dummy second separator 108 has the same structure as the second separator 36 (see FIG. 3) except that an inlet disconnecting section 122a is provided instead of the fuel gas supply holes 72a (see FIG. 3), and an outlet disconnecting section 122b is provided instead of the fuel gas discharge holes 72b (see FIG. 3).

That is, a surface 108b (see FIG. 2) of the dummy second separator 108 at the other end (side indicated by the arrow A2) has the same structure as the surface 36b of the second separator 36 on the side indicated by the arrow A2 except that the fuel gas supply holes 72a and the fuel gas discharge holes 72b surrounded by the seal member 71 as shown in FIG. 5 are not provided. Therefore, the surface 108b of the dummy second separator 108 has the same structure as the surface 32b of the first separator 32 at the other end (side indicated by the arrow A2) shown in FIG. 4.

As shown in FIG. 2, the first space 109 corresponding to the oxygen-containing gas flow field 56 is provided between the surface 108b of the dummy second separator 108 at the other end (side indicated by the arrow A2) and the cathode 86 side of the resin frame equipped MEA 34 (side indicated by the arrow A1).

As shown in FIGS. 2 and 11, a second space 126 corresponding to the fuel gas flow field 66 is provided between a surface 108a of the dummy second separator 108 at one end (side indicated by the arrow A1) and the other end (side indicated by the arrow A2) of the resin frame equipped dummy structural body 106. The second space 126 is disconnected from the fuel gas supply passage 44 by the inlet disconnecting section 122a, and disconnected from the fuel gas discharge passage 42 by the outlet disconnecting section 122b. That is, since the inlet disconnecting section 122a and the outlet disconnecting section 122b (hereinafter, the inlet disconnecting section 122a and the outlet disconnecting section 122b are also referred to as the disconnecting section(s), collectively) limit flow of the fuel gas into the second space 126, a heat insulating space is formed inside the second space 126.

It should be noted that only one of the inlet disconnecting section 122a and the outlet disconnecting section 122b may be provided to limit the flow of the fuel gas into the second space 126 to form the heat insulating space. Further, in the embodiment of the present invention, the disconnecting section may be formed by adopting structure where the fuel gas supply holes 72a and the fuel gas discharge holes 72b (see FIG. 3) do not penetrate through the dummy second separator 108. However, the present invention is not limited specially in this respect. For example, the disconnecting section may have structure where, though the fuel gas supply holes 72a and the fuel gas discharge holes 72b penetrate through the dummy second separator 108, the fuel gas supply holes 72a and the fuel gas discharge holes 72b are closed. As shown in FIG. 11, the surface 108a of the dummy second separator 108 is provided with a seal member 127 around the second space 126 to provide sealing between the inside of the outside of the seal member 127 in the surface direction.

As shown in FIG. 2, the first dummy cell 18 is formed by stacking, from the side indicated by the arrow A1 toward the side indicated by the arrow A2, a dummy first separator 105, a resin frame equipped dummy structural body 106, a dummy second separator 108, a resin frame equipped dummy structural body 106, and a dummy third separator 130 together in this order.

A surface 130b of the dummy third separator 130 at the other end (side indicated by the arrow A2) has the same structure as the surface 32a of the first separator 32 at one end (side indicated by the arrow A1) shown in FIG. 3. Further, as shown in FIG. 11, a surface 130a of the dummy third separator 130 on the side indicated by the arrow A1 has the same structure as the surface 108a of the dummy second separator 108 on the side indicated by the arrow A1.

As shown in FIG. 2, the coolant flow field 52 is provided between the surface 130b of the dummy third separator 130 on the side indicated by the arrow A2 and the dummy first separator 105 of the first end power generation unit 16. As shown in FIGS. 2 and 11, the second space 126 corresponding to the fuel gas flow field 66 is provided between the surface 130a of the dummy third separator 130 on the side indicated by the arrow A1 and the other end (side indicated by the arrow A2) of the resin frame equipped dummy structural body 106. Further, in the first dummy cell 18, the second space 126 is provided between the surface 108a of the dummy second separator 108 on the side indicated by the arrow A1 and the other end (side indicated by the arrow A2) of the resin frame equipped dummy structural body 106.

Further, in the first dummy cell 18, the first space 109 is formed at each of the positions between the surface 105b of the dummy first separator 105 on the side indicated by the arrow A2 and a portion of the resin frame equipped dummy structural body 106 on the side indicated by the arrow A1, and between the surface 108b of the dummy second separator 108 on the side indicated by the arrow A2 and a portion of the resin frame equipped dummy structural body 106 on the side indicated by the arrow A1.

The second dummy cell 20 is formed by stacking, from the side indicated by the arrow A1 toward the side indicated by the arrow A2, the dummy first separator 105, the resin frame equipped dummy structural body 106, and the dummy third separator 130 in this order. Therefore, in the second dummy cell 20, the first space 109 is provided between the surface 105b of the dummy first separator 105 on the side indicated by the arrow A2 and a portion of the resin frame equipped dummy structural body 106 on the side indicated by the arrow A1. Further, the second space 126 is provided between the surface 130a of the dummy third separator 130 on the side indicated by the arrow A1 and a portion of the resin frame equipped dummy structural body 106 on the side indicated by the arrow A2. The third dummy cell 24 has the same structure as the second dummy cell 20.

The separators which can form the second dummy cell 20 and the third dummy cell 24 are not limited to have the above structure. For example, the second dummy cell 20 may be formed by stacking, from the side indicated by the arrow A1 toward the side indicated by the arrow A2, the dummy second separator 108, the resin frame equipped dummy structural body 106, and the first separator 32 in this order. The third dummy cell 24 may be formed by stacking, from the side indicated by the arrow A1 toward the side indicated by the arrow A2, the first separator 32, the resin frame equipped dummy structural body 106, and the dummy second separator 108 in this order.

The second end power generation unit 22 is formed by stacking, from the side indicated by the arrow A1 toward the side indicated by the arrow A2, the first separator 32, the resin frame equipped MEA 34, the dummy second separator 108, the resin frame equipped dummy structural body 106, and the dummy third separator 130 together in this order. Therefore, in the second end power generation unit 22, the first space 109 is formed between the surface 108b of the dummy second separator 108 on the side indicated by the arrow A2 and a portion of the resin frame equipped dummy structural body 106 on the side indicated by the arrow A1. Further, the second space 126 is formed between the surface 130a of the dummy third separator 130 on the side indicated by the arrow A1 and a portion of the resin frame equipped dummy structural body 106 on the side indicated by the arrow A2.

The terminal plates 26a, 26b are made of electrically conductive material. For example the terminal plates 26a, 26b are made of metal such as copper, aluminum, or stainless steel. As shown in FIG. 1, terminal units 132a, 132b extending outward in the stacking direction are provided at substantially centers of the terminal plates 26a, 26b.

The terminal unit 132a is inserted into an insulating cylindrical body 134a to penetrate through a hole 136a of the insulator 28a and a hole 138a of the end plate 30a to protrude to the outside of the end plate 30a. The terminal unit 132b is inserted into an insulating cylindrical body 134b. The terminal unit 132b penetrates through a hole 136b of the insulator 28b and a hole 138b of the end plate 30b, and protrudes to the outside of the end plate 30b.

The insulators 28a, 28b are made of insulating material such as polycarbonate (PC), phenol resin, etc. Accommodation parts 140a, 140b are formed at the centers of the insulators 28a, 28b. The accommodation parts 140a, 140b are opened toward the power generation cell stack body 14. The accommodation parts 140a, 140b are connected to the holes 136a, 136b.

Reactant gas passages are provided in the insulator 28a and the end plate 30a. The coolant supply passages 48 and the coolant discharge passages 50 are provided in the insulator 28b and the end plate 30b.

The terminal plate 26a and a heat insulating body 142 are accommodated in the accommodation part 140a. The terminal plate 26b and the heat insulating body 142 are accommodated in the accommodation part 140b. The heat insulating body 142 is formed by sandwiching an electrically conductive heat insulating member 146 between a pair of electrically conductive heat insulating plates 144. For example, the heat insulating plates 144 are porous carbon plates having a flat shape, and the heat insulating member 146 is a metal plate having a corrugated shape in cross section.

The heat insulating plate 144 and the heat insulating member 146 may be made of the same material. Further, the heat insulating body 142 may have a single heat insulating plate 144 and a single heat insulating member 146. Further, a resin spacer (not shown) may be interposed between the terminal plates 26a, 26b and the bottoms of the accommodation parts 140a, 140b of the insulators 28a, 28b.

The dummy cell of the fuel cell stack 11 basically having the above structure can be produced, e.g., using an apparatus 10 for producing the dummy cell according to the embodiment of the present invention shown in FIGS. 12 to 15 (hereinafter simply referred to as the production apparatus 10). The production apparatus 10 includes a pair of plates 164 including a lower plate 160 and an upper plate 162, and a limitation projection 166 provided for the upper plate 162, as main components.

For example, the lower plate 160 is made of metal, and has a placement surface 170. A single piece of the dummy resin frame member 111 can be placed on the placement surface 170. Further, a dummy stack body 168 (FIG. 14) formed by stacking the dummy resin frame member 111 and the dummy structural body 110 together in a state where the adhesive 120a is interposed between the dummy resin frame member 111 and the dummy structural body 110 can be placed on the placement surface 170.

For example, the upper plate 162 is made of metal, and has a frame shape (see FIG. 15) for allowing an outer peripheral portion of the dummy resin frame member 111 to be held between the lower plate 160 and the upper plate 162. Specifically, the upper plate 162 is provided in a manner that the upper plate 162 can move closer to, or away from the placement surface 170 of the lower plate 160 by drive means, etc. (not shown). By moving the upper plate 162 closer to the lower plate 160 where the dummy resin frame member 111 is placed, the outer peripheral portion of the dummy resin frame member 111 can be held between the lower plate 160 and the upper plate 162. At this time, a portion of the dummy resin frame member 111 on the inner peripheral side of the outer peripheral portion can be exposed from the upper plate 162, through an opening 172 provided on the inner peripheral side of the frame shaped upper plate 162.

Figure 15:
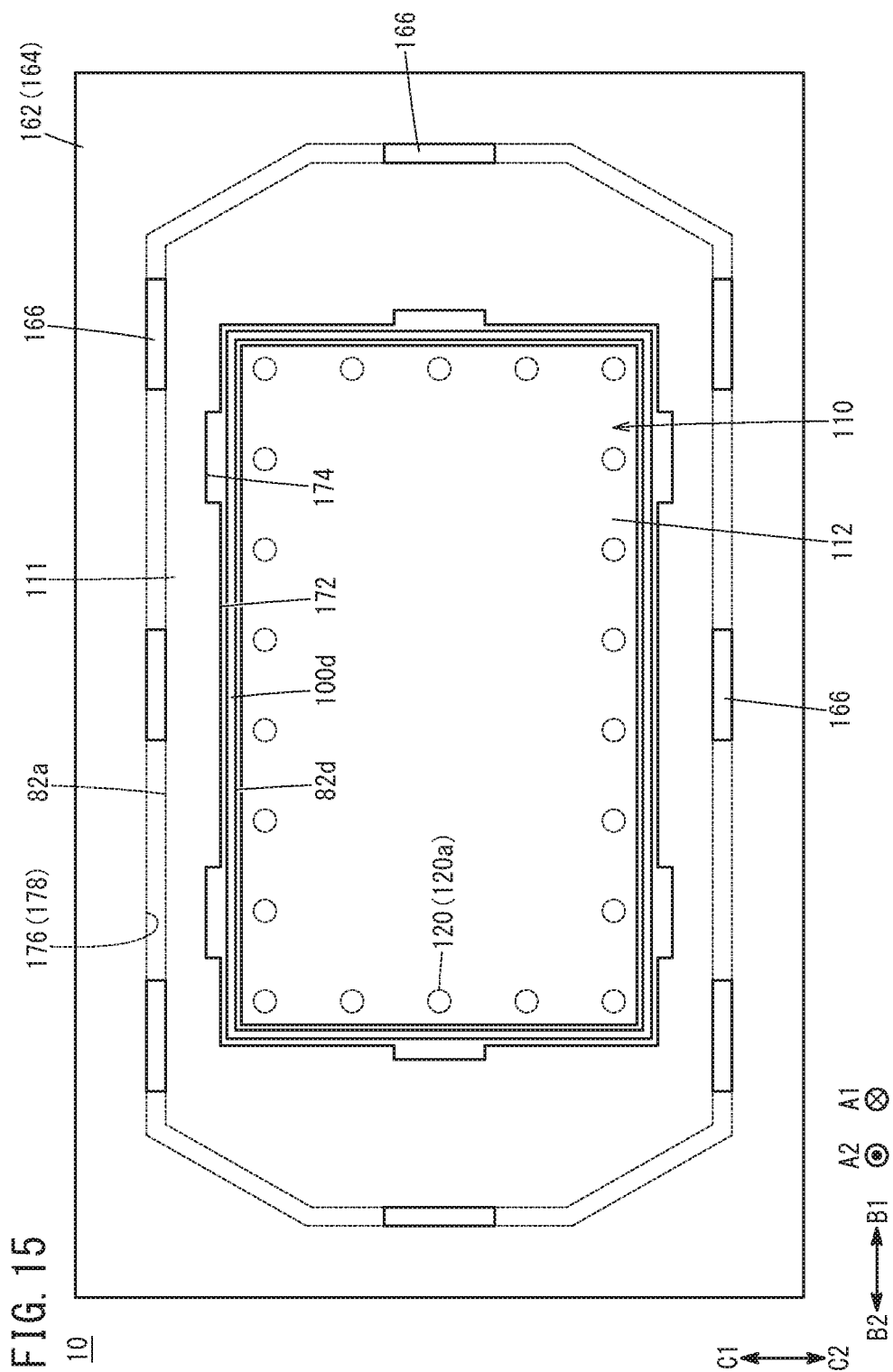
FIG. 15 is a top plan view schematically showing an apparatus for producing a dummy cell in a state where a dummy stack body is set in the apparatus.

As shown in FIG. 15, a plurality of cutouts 174 are provided in the inner peripheral portion of the opening 172 of the upper plate 162. The cutouts 174 have a shape formed by cutting the inner peripheral portion of the opening 172 toward the outer peripheral side. It is possible to check the relative position, etc. of the dummy resin frame member 111 held between the lower plate 160 and the upper plate 162 through the cutouts 174.

Figure 12:
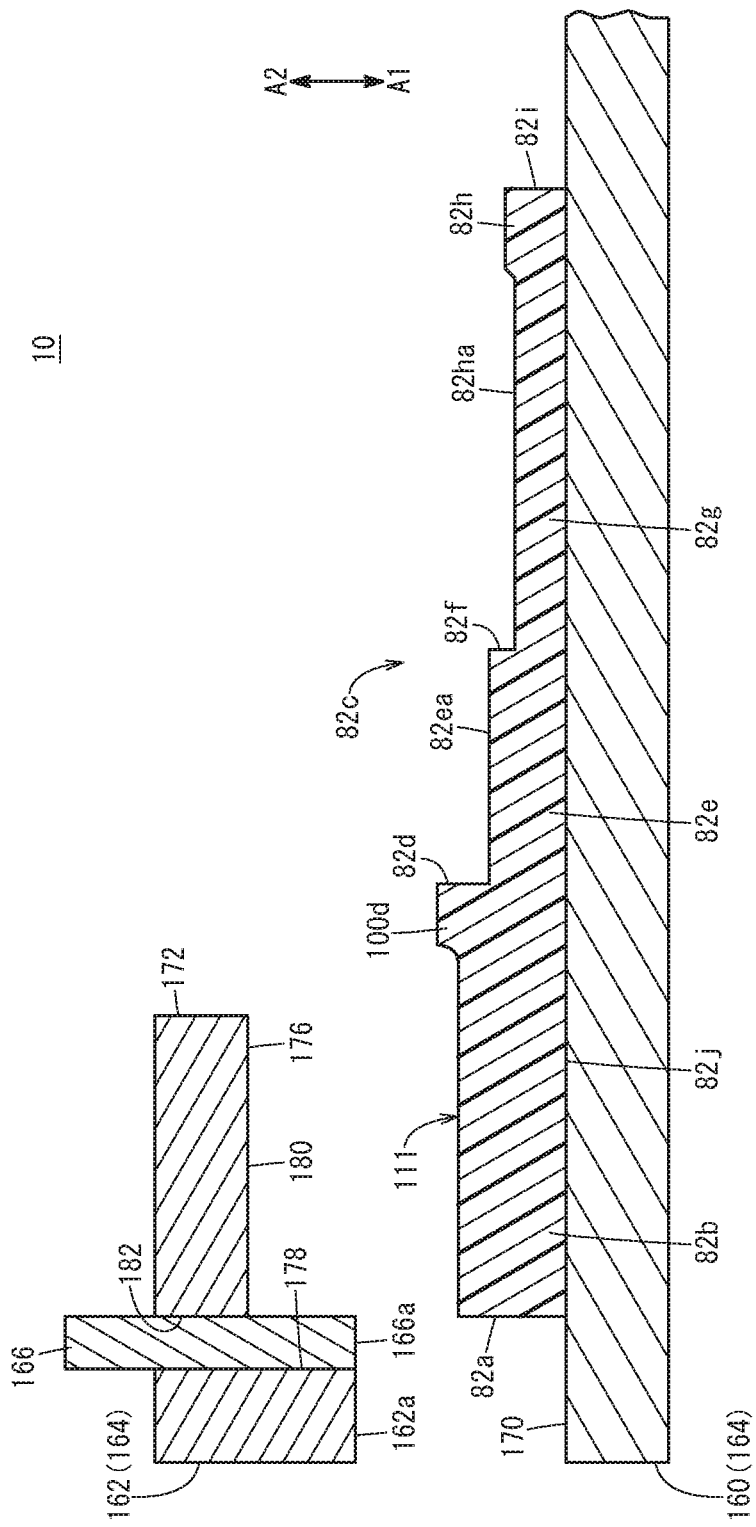
FIG. 12 is a view showing a state where a dummy resin frame member is disposed on a lower plate of an apparatus for producing a dummy cell according to an embodiment of the present invention.

As shown in FIG. 12, a recess 176 recessed upward is provided in the inner peripheral portion of the upper plate 162, on a side positioned close to the dummy resin frame member 111. As shown in FIG. 15, the shape of the recess 176 corresponds to the outer shape of the dummy resin frame member 111, and larger than the outer shape of the dummy resin frame member 111. Therefore, a side surface 178 of the recess 176 is positioned close to the outer peripheral end surface 82a of the dummy resin frame member 111 at a predetermined distance.

Further, as shown in FIG. 12, the depth of the recess 176 is substantially equal to the thickness of the outer peripheral portion of the dummy resin frame member 111. Therefore, as shown in FIG. 13, when the upper plate 162 is moved closer to the lower plate 160 in a manner that the outer peripheral portion of the dummy resin frame member 111 is placed in the recess 176, the outer peripheral portion of the dummy resin frame member 111 is held between an upper bottom surface 180 of the recess 176 and the placement surface 170 of the lower plate 160.

A through hole 182 is provided in the upper plate 162. The through hole 182 penetrates through the upper plate 162 in the thickness direction, and is connected to the recess 176. In the embodiment of the present invention, for example, the limitation projection 166 is fitted into the through hole 182 to detachably attach the limitation projection 166 to the upper plate 162. Specifically, the limitation projection 166 is inserted into the through hole 182 and the recess 176 until a lower end surface 162a of the upper plate 162 and a lower end surface 166a of the limitation projection 166 are positioned in the same plane, and in this state, the relative positions of the limitation projection 166 and the upper plate 162 are fixed.

Figure 13:
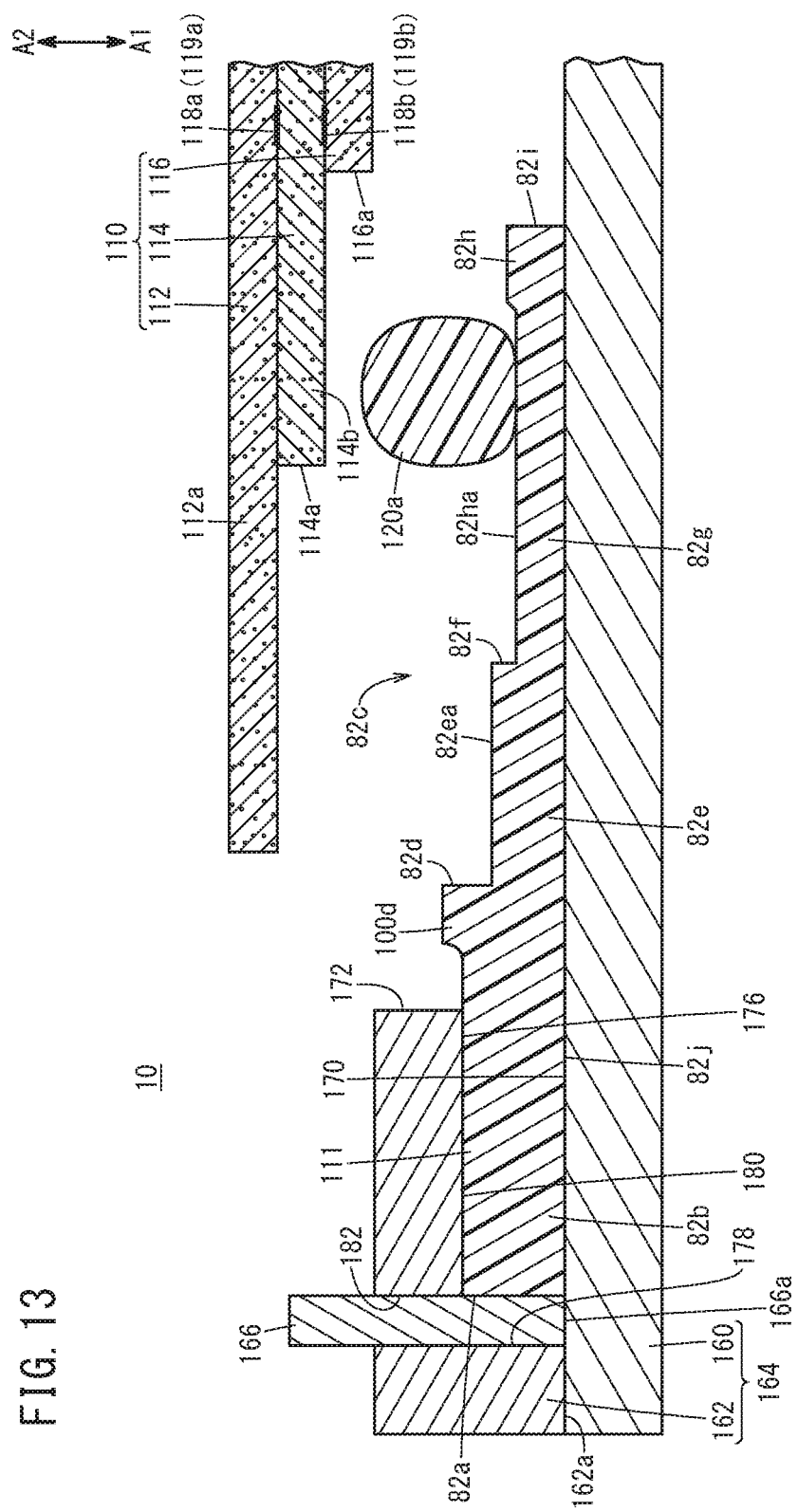
FIG. 13 is a view showing a state where a dummy structural body formed by a dummy structural body forming step is positioned close to a dummy resin frame member in FIG. 12 through adhesive.
Figure 14:
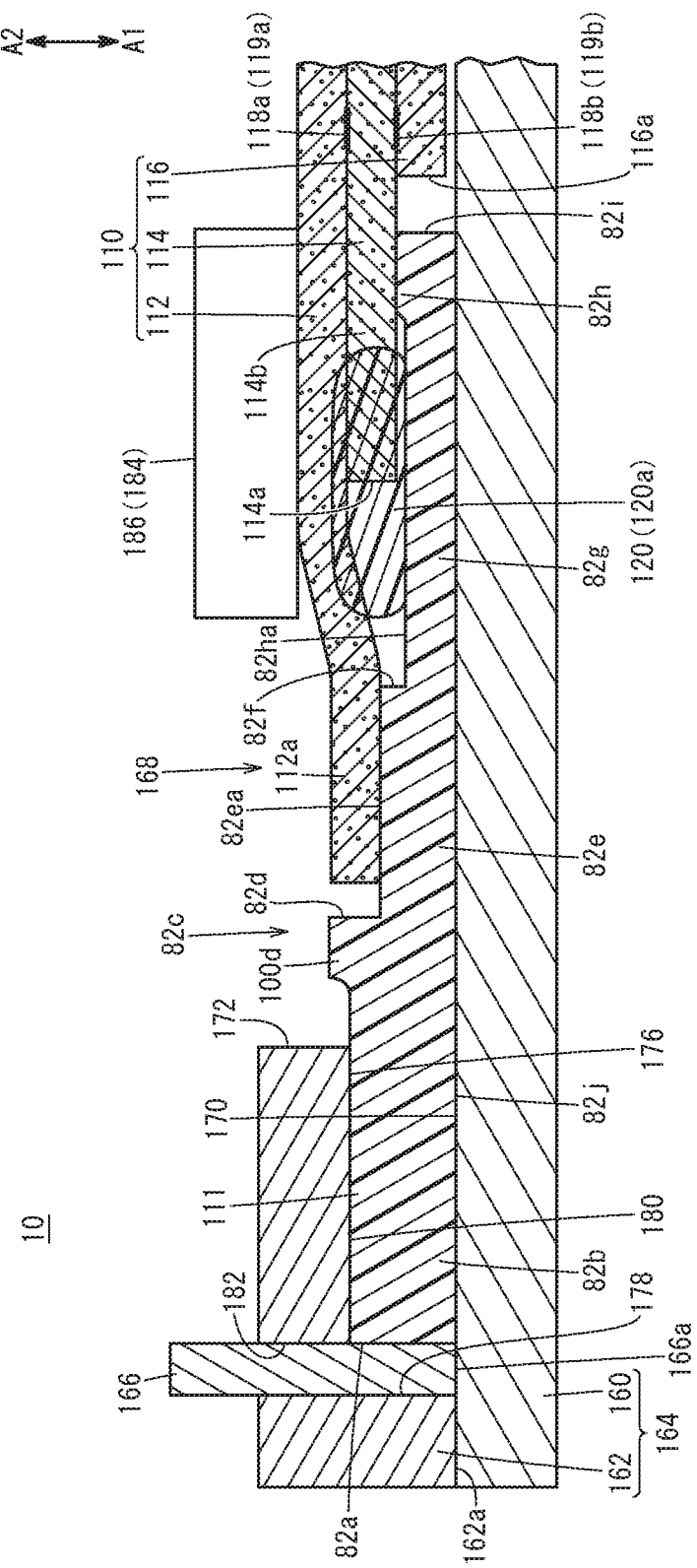
FIG. 14 is a view showing a joining step of joining the dummy resin frame member and the dummy structural body in FIG. 13 together.

Therefore, as shown in FIGS. 13 and 14, when the outer peripheral portion of the dummy resin frame member 111 is held between the upper bottom surface 180 of the recess 176 and the placement surface 170 of the lower plate 160, the limitation projection 166 is interposed between the side surface 178 of the recess 176 and the outer peripheral end surface 82a of the dummy resin frame member 111, and contacts the outer peripheral end surface 82a. It should be noted that the limitation projection 166 need not necessarily be a member which is separate from the upper plate 162. The limitation projection 166 and the upper plate 162 may be in the form of a single piece of component. Further, the through hole 182 need not necessarily be provided in the upper plate 162. For example, the limitation projection 166 having the same width as the depth of the recess 176 may be provided inside the recess 176.

As shown in FIG. 15, a plurality of (e.g., eight) limitation projections 166 are provided at a distance from each other, along the outer periphery of the dummy resin frame member 111 having a substantially rectangular shape. Further, the limitation projection 166 provided along one of the long sides of the dummy resin frame member 111 and the limitation projection 166 provided along the other of the long sides of the dummy resin frame member 111 are provided to face each other through the dummy structural body 110 in the direction indicated by the arrows C1 and C2. For example, one limitation projection 166 provided along one of the short sides of the dummy resin frame member 111 and one limitation projection 166 provided along the other of the short sides of the dummy resin frame member 111 are provided to face each other through the dummy structural body 110 in the direction indicated by the arrows B1 and B2.

Hereinafter, a method of producing a dummy cell according to the embodiment of the present invention will be described taking a case of obtaining the first dummy cell 18 using the production apparatus 10 having the above structure, as an example. As shown in FIGS. 10 and 13, the first electrically conductive porous body 112, the second electrically conductive porous body 114, and the third electrically conductive porous body 116 are stacked together in this order to perform a dummy structural body forming step of obtaining the dummy structural body 110.

Specifically, as shown in FIG. 13, the first electrically conductive porous body 112 and the second electrically conductive porous body 114 are stacked together through the adhesive 119a in the form of spots, and the second electrically conductive porous body 114 and the third electrically conductive porous body 116 are stacked together through the adhesive 119b in the form of spots. Then, by hardening the adhesive 119a, and the adhesive 119b in the form of spots to form the adhesive layers 118a, 118b in the form of spots, respectively, the first electrically conductive porous body 112, the second electrically conductive porous body 114, and the third electrically conductive porous body 116 are joined together to obtain the dummy structural body 110.

After or before performing the dummy structural body forming step, as shown in FIG. 12, the upper plate 162 is moved closer to the dummy resin frame member 111 placed on the placement surface 170 of the lower plate 160 in a manner that the groove 82ha is oriented upward. As a result, as shown in FIG. 13, the outer peripheral portion of the dummy resin frame member 111 is held between the placement surface 170 of the lower plate 160 and the upper bottom surface 180 of the recess 176 of the upper plate 162.

At this time, as shown in FIGS. 13 and 15, the limitation projection 166 which is interposed between the side surface 178 of the recess 176 and the outer peripheral end surface 82a of the dummy resin frame member 111 is brought into contact with the outer peripheral end surface 82a of the dummy resin frame member 111.

Next, a joining step of joining components of the dummy stack body 168 together into a single piece of the dummy stack body 168 is performed. The dummy stack body 168 (see FIG. 14) is formed by stacking the dummy structural body 110 and the dummy resin frame member 111 together in a state where the adhesive 120a is present between the dummy structural body 110 and the dummy resin frame member 111. The joining step is performed by applying heat and pressure to a portion of the dummy stack body 168 where at least the adhesive 120a is present, to harden the adhesive 120a.

Specifically, in the joining step, firstly, as shown in FIG. 13, the adhesive 120a is disposed in the groove 82ha of the dummy resin frame member 111 exposed through the opening 172 of the upper plate 162, using a dispenser, etc. (not shown). In the embodiment of the present invention, though the adhesive 120a is disposed discontinuously in the inner periphery of the dummy resin frame member 111, the adhesive 120a may be disposed continuously around the inner periphery of the dummy resin frame member 111.

Next, the first outer peripheral portion 112a and the second outer peripheral portion 114b of the dummy structural body 110 are stacked on the inner periphery of the dummy resin frame member 111. Specifically, the first outer peripheral portion 112a of the first electrically conductive porous body 112 is stacked on the shelf portion 82e of the dummy resin frame member 111. Further, the second outer peripheral portion 114b of the second electrically conductive porous body 114 is positioned close to the thin portion 82g of the dummy resin frame member 111, and to contact the protruding end surface of the bank 82h. Further, the outer peripheral end surface 116a of the third electrically conductive porous body 116 is positioned to face the inner peripheral end surface 82i of the dummy resin frame member 111.

In this manner, as shown in FIG. 14, in the stacking direction (thickness direction) of the dummy structural body 110, the adhesive 120a is impregnated into the entire second electrically conductive porous body 114 and part of the first electrically conductive porous body 112 positioned close to the second electrically conductive porous body 114. At this time, the adhesive 120a pressed between the groove 82ha and the second outer peripheral portion 114b is spread up to a position between the first outer peripheral portion 112a and the groove 82ha.

A heating plate 186 of a heating and pressing mechanism 184 is brought into contact with a portion of the dummy stack body 168 formed as described above where at least the adhesive 120a is present, from above, through the opening 172 of the upper plate 162. The heating plate 186 is driven by drive means (not shown), such that the heating plate 186 can move closer to the lower plate 160. The heating plate 186 is heated by a heater, etc. (not shown) up to a temperature at which it is possible to harden the adhesive 120a. Therefore, by holding the dummy stack body 168 between the heating plate 186 and the lower plate 160, it is possible to press, and heat the dummy stack body 168.

At this time, the plurality of limitation projections 166 disposed as described above contact the outer peripheral end surface 82a of the dummy resin frame member 111. Therefore, in the state where outward deformation of the dummy resin frame member 111 is limited, it is possible to apply heat and pressure to the dummy stack body 168.

As a result, the adhesive 120a is thermally hardened to form the adhesive layer 120. The first outer peripheral portion 112a and the second outer peripheral portion 114b, and the dummy resin frame member 111 are adhered to each other through the adhesive layer 120. As a result, the dummy structural body 110, the dummy resin frame member 111 (components of the dummy stack body 168) are joined together, and the resin frame equipped dummy structural body 106 as shown in FIG. 9 is obtained.

After the two resin frame equipped dummy structural bodies 106 are obtained through the above steps, as shown in FIG. 2, the dummy first separator 105, the frame equipped dummy structural body 106, the dummy second separator 108, the resin frame equipped dummy structural body 106, and the dummy third separator 130 are stacked together in this order to form the first dummy cell 18.

The second dummy cell 20 and the third dummy cell 24 can be obtained by sandwiching the resin frame equipped dummy structural body 106 between the dummy first separator 105 and the dummy third separator 130.

Operation of the fuel cell stack 11 including the first dummy cell 18, the second dummy cell 20, and the third dummy cell 24 obtained as described above will be described below. Firstly, as shown in FIG. 1, the oxygen-containing gas is supplied to the oxygen-containing gas supply passage 40 of the end plate 30a. A fuel gas such as a hydrogen-containing gas is supplied to the fuel gas supply passage 44 of the end plate 30a. A coolant such as pure water, ethylene glycol, oil is supplied to each of the coolant supply passages 48 of the end plate 30b.

As shown in FIGS. 4 and 5, the oxygen-containing gas supplied to the oxygen-containing gas supply passage 40 flows into the oxygen-containing gas flow field 56 and the first space 109 through the connection channel 125 formed inside the inlet connection groove 62a. As a result, while the oxygen-containing gas moves in the direction indicated by the arrows B1 and B2, the oxygen-containing gas is supplied to the cathode 86 of each of the membrane electrode assemblies 80 and the dummy structural body 110.

As shown in FIG. 3, the fuel gas supplied to the fuel gas supply passage 44 flows into the fuel gas flow field 66 of the second separator 36 and the third separator 38 through the fuel gas supply holes 72a. As a result, while the fuel gas moves in the direction indicated by the arrows B1 and B2, the fuel gas is supplied to the anode 88 of each of the membrane electrode assemblies 80. In the meanwhile, as shown in FIG. 11, entry of the fuel gas into the second space 126 of the dummy second separator 108 and the dummy third separator 130 is blocked by the inlet disconnecting section 122a.

After the reactant gases are supplied to the membrane electrode assembly 80 as described above, the oxygen-containing gas supplied to each of the cathodes 86 and the fuel gas supplied to each of the anodes 88 are partially consumed in electrochemical reactions in the first electrode catalyst layer 90 and the second electrode catalyst layer 94 to perform power generation.

Then, after the oxygen-containing gas is supplied to, and partially consumed at each of the cathodes 86, the oxygen-containing gas is discharged from each of the oxygen-containing gas flow field 56 and the first space 109 to the oxygen-containing discharge passage 46 through the connection channel 125 formed inside the outlet connection grooves 62b. Then, the oxygen-containing gas is discharged to the outside of the fuel cell stack 11 through the oxygen-containing gas discharge passage 46 of the end plate 30a.

Likewise, after the fuel gas is supplied to, and partially consumed at each of the anodes 88, the fuel gas is discharged from the fuel gas flow field 66 into the fuel gas discharge passage 42 through the inside of the fuel gas discharge holes 72b. Then, the fuel gas is discharged to the outside of the fuel cell stack 11 through the fuel gas discharge passage 42 of the end plate 30a.

In this regard, as shown in FIG. 11, the second space 126 is disconnected from the fuel gas discharge passage 42 as well by the outlet disconnecting section 122b.

Therefore, as described above, the flow of the fuel gas into the second space 126 is disconnected by the inlet disconnecting section 122a, and entry of the fuel gas into the second space 126 from the fuel gas discharge passage 42 is avoided by the outlet disconnecting section 122b. As a result, flow of the fuel gas through the second space 126 is disconnected by the disconnecting section, and the second space 126 functions as a heat insulating space.

Further, as shown in FIG. 2, the coolant supplied to each of the coolant supply passages 48 flows into the coolant flow field 52 between the dummy first separator 105 and the dummy third separator 130 that are adjacent to each other, and the coolant flow field 52 between the first separator 32 and the third separator 38 that are adjacent to each other. As shown in FIG. 3, the coolant supplied from the coolant supply passage 48 on the side indicated by the arrow C1 and the coolant supplied from the coolant supply passage 48 on the side indicated by the arrow C2 flow toward each other in the direction indicated by the arrow C1, C2, and then, the coolant flows in the direction indicated by the arrow B2. Then, while the coolant cools the membrane electrode assembly 80, the coolant flows in the direction indicated by the arrows C1, C2 away from each other, and then, the coolant is discharged from each of the coolant discharge passages 50.

As described above, in the production apparatus 10 and the production method according to the embodiment of the present invention, in the state where the limitation projection 166 is brought into contact with the outer peripheral end surface 82a of the dummy resin frame member 111 to limit outward deformation of the dummy resin frame member 111, heat and pressure are applied to the dummy stack body 168. In this manner, by joining the dummy resin frame member 111 and the dummy structural body 110 together, it is possible to obtain the dummy cells (the first dummy cell 18, the second dummy cell 20, and the third dummy cell 24) in which deformation of the dummy resin frame member 111 is suppressed effectively.

Each of the dummy cells includes the dummy structural body 110 corresponding to the membrane electrode assembly 80 of the power generation cell 12. That is, since each of the dummy cells does not include the electrolyte membrane 84, and the first electrode catalyst layer 90, and the second electrode catalyst layer 94, power generation is not performed, and thus, no water is produced. As a result, each of the dummy cells itself functions as a heat insulating layer, and it is possible to suppress condensation in each of the dummy cells.

The first dummy cell 18 and the second dummy cell 20 having the above structure are provided at one end of the power generation cell stack body 14 in the direction indicated by the arrow A1, and the third dummy cell 24 is provided at the end of the power generation cell stack body 14 in the direction indicated by the arrow A2. In the structure, it is possible to improve heat insulating performance at the ends of the power generation cell stack body 14. Therefore, even under the low temperature environment, it is possible to eliminate or reduce the situation where the temperature at the ends of the power generation cell stack body 14 becomes low in comparison with the central side.

Further, since it is possible to improve the heat insulating performance at the ends of the power generation cell stack body 14, even in the case of starting operation of starting the fuel cell stack 11 at the freezing temperature or less, it is possible to effectively increase the temperature of the entire power generation cell stack body 14. In this manner, it is possible to eliminate, or reduce the situation where water, etc. produced in power generation is frozen in the vicinity of the ends of the power generation cell stack body 14, and voltage decreases.

In the joining step in the production method according to the above embodiment, in the state where the outer peripheral portion of the dummy resin frame member 111 is held between the pair of plates 164, heat and pressure are applied to the dummy stack body 168. In this case, the state where the limitation projection 166 and the outer peripheral end surface 82a of the dummy resin frame member 111 are brought into contact with each other is maintained suitably, and in this state, heat and pressure can be applied to the dummy stack body 168. Therefore, it is possible to suppress deformation of the dummy resin frame member 111 more effectively.

In the production method according to the above embodiment, the pair of plates 164 include the lower plate 160 disposed on the lower side, and the upper plate 162 having a frame shape and disposed on the upper side, in the upper/lower direction, and in the joining step, in the state where the limitation projection 166 provided for the upper plate 162 is brought into contact with the outer peripheral end surface 82a of the dummy resin frame member 111, heat and pressure are applied to the dummy stack body 168. However, the limitation projection 166 may be provided for the lower plate 160 instead of the upper plate 162. Also in this case, the limitation projection 166 and the lower plate 160 may be different members, or the limitation projection 166 and the lower plate 160 may be in the form of a single piece of component.

In the production method according to the above embodiment, the recess 176 is provided in part of the inner peripheral portion of the upper plate 162 positioned close to the outer peripheral portion of the dummy resin frame member 111, and in the joining step, in the state where the outer peripheral portion of the dummy resin frame member 111 is held between an upper bottom surface 180 of the recess 176 and the lower plate 160, and the limitation projection 166 which is interposed between the side surface 178 of the recess 176 and the outer peripheral end surface 82a of the dummy resin frame member 111 is brought into contact with the outer peripheral end surface 82a of the dummy resin frame member 111, heat and pressure are applied to the dummy stack body 168.

Further, in the production apparatus 10 according to the above embodiment, the recess 176 is provided in part of the inner peripheral portion of the upper plate 162 positioned close to the outer peripheral portion of the dummy resin frame member 111, and the outer peripheral portion of the dummy resin frame member 111 is held between the upper bottom surface 180 of the recess 176 and the lower plate 160, and the limitation projection 166 is provided between the side surface 178 of the recess 176 and the outer peripheral end surface 82a of the dummy resin frame member 111.

In these case, with simple structure where the recess 176 is provided in the upper plate 162, the state where the limitation projection 166 is brought into contact with the outer peripheral end surface 82*a* of the dummy resin frame member 111 is maintained suitably, and in this state, it is possible to apply heat and pressure to the dummy stack body 168.

In the joining step in the production method according to the above embodiment, the adhesive 120*a* is provided continuously, or discontinuously between the dummy structural body 110 and the dummy resin frame member 111, around an outer periphery of the dummy structural body 110. In the case where the adhesive 120*a* is provided continuously, it is possible to firmly join the dummy resin frame member 111 and the dummy structural body 110 together. On the other hand, in the dummy cell, unlike the power generation cell 12, since it is not necessary to suppress cross leakage of the reactant gas, it is possible to provide the adhesive 120*a* discontinuously. In this case, it is possible to join the dummy resin frame member 111 and the dummy structural body 110 together efficiently using small quantity of the adhesive 120*a*.

In the dummy structural body forming step in the production method according to the above embodiment, as the plurality of electrically conductive porous bodies, the dummy structural body 110 is formed by stacking the first electrically conductive porous body 112, the second electrically conductive porous body 114 having a surface size smaller than that of the first electrically conductive porous body 112, and the third electrically conductive porous body 116 having a surface size smaller than that of the second electrically conductive porous body 114 together in this order, and in the joining step, the adhesive 120*a* is interposed at least between the outer peripheral portion (second outer peripheral portion 114*b*) of the second electrically conductive porous body 114 and the dummy resin frame member 111. By the adhesive layer 120 formed by hardening the adhesive 120*a* disposed as described above, it is possible to join the dummy structural body 110 and the dummy resin frame member 111 together effectively.

In the method of producing the dummy cell according to the above embodiment, the plurality of electrically conductive porous bodies (the first electrically conductive porous body 112, the second electrically conductive porous body 114, the third electrically conductive porous body 116) stacked in the dummy structural body forming step are joined together by the adhesive 119*a*, 119*b* disposed between the plurality of electrically conductive porous bodies, discontinuously in the form of spots in a peripheral direction. In this case, it is possible to join the plurality of electrically conductive porous bodies together efficiently using small quantity of adhesive, to obtain the dummy structural body 110. The plurality of electrically conductive porous bodies may be joined together by adhesive disposed continuously in a ring pattern in a peripheral direction (not shown) instead of the adhesives 119*a*, 119*b* in the form of spots.

In the method of producing the dummy cell according to the above embodiment, the dummy resin frame member 111 has a rectangular shape, in the joining step, in a state where a plurality of limitation projections 166 provided at a distance from each other along outer periphery of the dummy resin frame member 111 are brought into contact with the outer peripheral end surface 82*a* of the dummy resin frame member 111, respectively, heat and pressure are applied to the dummy stack body 168, and the limitation projection 166 provided along one of the long sides of the dummy resin frame member 111 and the limitation projection 166 provided along the other of the long sides of the dummy resin frame member 111 are configured to face each other through the dummy structural body 110. In this case, at the time of joining the components of the dummy stack body 168 together, it becomes possible to suppress deformation of the dummy resin frame member 111 more effectively.

In the production apparatus 10 according to the above embodiment, the limitation projection 166 is detachably attached to the upper plate 162. In this case, it becomes possible to replace the limitation projection 166, and it becomes easy to perform maintenance operation, etc. of the production apparatus 10. Further, even in the case of adopting a dummy resin frame member having an outer shape which is different from that of the dummy resin frame member 111, it is possible to replace the limitation projection 166 in a manner that the limitation projection 166 contacts the outer peripheral end surface of the dummy resin frame member, and enhance the versatility of the production apparatus 10.

The present invention is not limited to the above embodiment. Various modifications may be made without departing from the gist of the present invention.

In the fuel cell stack 11 according to the above embodiment, the first end power generation unit 16, the first dummy cell 18, and the second dummy cell 20 are stacked together on the side of the power generation cell stack body 14 indicated by the arrow A1, and the second end power generation unit 22 and the third dummy cell 24 are stacked together on the side of the power generation cell stack body 14 indicated by the arrow A2.

As described above, the number of dummy cells provided on the power generation cell stack body 14 on the side indicated by the arrow A2 (outlet side of the oxygen-containing gas) is larger than the number of dummy cells provided on the power generation cell stack body 14 on the side indicated by the arrow A1 (inlet side of the oxygen-containing gas). Therefore, it is possible to more effectively suppress entry of the condensed water into the power generation cell 12. However, it is sufficient that the fuel cell stack 11 includes the dummy cell at least at one end of the power generation cell stack body 14 in the stacking direction. The number of dummy cells is not limited specially as well.

Further, the first end power generation unit 16 or the second end power generation unit 22 is interposed between the power generation cell 12 and the first dummy cell 18 or the third dummy cell 24. In this manner, it becomes possible to cool the membrane electrode assemblies 80 in the first end power generation unit 16 and the second end power generation unit 22 for performing power generation at both ends in the stacking direction of the power generation cell stack body 14, under the same condition as the other membrane electrode assemblies 80. As a result, since it is possible to ensure that the balance between heat generation and cooling becomes uniform over the entire power generation cell stack body 14, it is possible to achieve further improvement in the power generation performance and the power generation stability.

However, the first end power generation unit 16 and the second end power generation unit 22 are not essential constituent elements. The fuel cell stack 11 may include only one of the first end power generation unit 16 and the second end power generation unit 22, or may include neither the first end power generation unit 16 nor the second end power generation unit 22.

What is claimed is:

1. A method of producing a dummy cell provided at least at one end of a power generation cell stack body of a fuel cell stack in a stacking direction, the fuel cell stack comprising:
the power generation cell stack body including a plurality of power generation cells stacked in the stacking direction, the power generation cells each comprising a membrane electrode assembly including an electrolyte membrane and electrodes provided on both sides of the electrolyte membrane, the electrodes each having a gas diffusion layer of an electrically conductive porous body, and a resin frame member provided around an outer periphery of the membrane electrode assembly, the method comprising the steps of:
a dummy structural body forming step of obtaining a dummy structural body corresponding to the membrane electrode assembly by stacking a plurality of electrically conductive porous bodies together; and
a joining step of joining components of a dummy stack body together into a single piece of the dummy stack body, the dummy stack body being formed by stacking the dummy structural body and a dummy resin frame member provided around an outer periphery of the dummy structural body together in a state where an adhesive is interposed between the dummy structural body and the dummy resin frame member, the joining step being performed by applying heat and pressure to a portion of the dummy stack body where at least the adhesive is present, to harden the adhesive,
wherein, in the joining step, in a state where a limitation projection is brought into contact with an outer peripheral end surface of the dummy resin frame member to limit outward deformation of the dummy resin frame member, heat and pressure are applied to the dummy stack body.

2. The method of producing the dummy cell according to claim 1, wherein, in the joining step, in a state where an outer peripheral portion of the dummy resin frame member is held between a pair of plates, heat and pressure are applied to the dummy stack body.

3. The method of producing the dummy cell according to claim 2, wherein the pair of plates comprise a lower plate disposed on a lower side and an upper plate having a frame shape and disposed on an upper side, in an upper/lower direction; and
in the joining step, in a state where the limitation projection is provided for the upper plate and is brought into contact with the outer peripheral end surface of the dummy resin frame member, heat and pressure are applied to the dummy stack body.

4. The method of producing the dummy cell according to claim 3, wherein a recess is provided in part of an inner peripheral portion of the upper plate positioned close to an outer peripheral portion of the dummy resin frame member; and
in the joining step, in a state where an outer peripheral portion of the dummy resin frame member is held between an upper bottom surface of the recess and the lower plate, and the limitation projection which is interposed between a side surface of the recess and the outer peripheral end surface of the dummy resin frame member is brought into contact with the outer peripheral end surface of the dummy resin frame member, heat and pressure are applied to the dummy stack body.

5. The method of producing the dummy cell according to claim 1, wherein, in the joining step, the adhesive is provided continuously, or discontinuously between the dummy structural body and the dummy resin frame member, around an outer periphery of the dummy structural body.

6. The method of producing the dummy cell according to claim 1, wherein, in the dummy structural body forming step, as the plurality of electrically conductive porous bodies, the dummy structural body is formed by stacking a first electrically conductive porous body, a second electrically conductive porous body having a surface size smaller than that of the first electrically conductive porous body, and a third electrically conductive porous body having a surface size smaller than that of the second electrically conductive porous body together in this order; and
in the joining step, the adhesive is interposed at least between an outer peripheral portion of the second electrically conductive porous body and the dummy resin frame member.

7. The method of producing the dummy cell according to claim 1, wherein the plurality of electrically conductive porous bodies stacked in the dummy structural body forming step are joined together by an adhesive disposed between the plurality of electrically conductive porous bodies, discontinuously in the form of spots in a peripheral direction.

8. The method of producing the dummy cell according to claim 1, wherein the dummy resin frame member has a rectangular shape,
in the joining step, in a state where a plurality of limitation projections provided at a distance from each other along an outer periphery of the dummy resin frame member are brought into contact with the outer peripheral end surface of the dummy resin frame member, respectively, heat and pressure are applied to the dummy stack body; and
a limitation projection provided along a long sides of the dummy resin frame member and a limitation projection provided along another long sides of the dummy resin frame member are configured to face each other through the dummy structural body.

9. An apparatus for producing a dummy cell provided at least at one end of a power generation cell stack body of a fuel cell stack in a stacking direction, the fuel cell stack comprising:
the power generation cell stack body including a plurality of power generation cells stacked in the stacking direction, the power generation cells each comprising a membrane electrode assembly including an electrolyte membrane and electrodes provided on both sides of the electrolyte membrane, the electrodes each having a gas diffusion layer of an electrically conductive porous body, and a resin frame member provided around an outer periphery of the membrane electrode assembly, the apparatus comprising:
a lower plate where a dummy stack body is placed, the dummy stack body including a dummy structural body and a dummy resin frame member stacked around an outer periphery of the dummy structural body in a state where an adhesive is interposed between the dummy structural body and the dummy resin frame member, the dummy structural body including a plurality of stacked electrically conductive bodies;
a frame shaped upper plate, an outer peripheral portion of the dummy resin frame member being held between the lower plate and the upper plate; and
a limitation projection configured to contact an outer peripheral end surface of the dummy resin frame member held between the lower plate and the upper plate to limit outward deformation of the dummy resin frame member, at a time of applying heat and pressure to a portion of the dummy stack body where at least the adhesive is present by a heating and pressing mechanism, to harden the adhesive.

10. The apparatus for producing the dummy cell according to claim 9, wherein a recess is provided in part of an inner peripheral portion of the upper plate positioned close to an outer peripheral portion of the dummy resin frame member;

an outer peripheral portion of the dummy resin frame member is held between an upper bottom surface of the recess and the lower plate; and the limitation projection is provided between a side surface of the recess and the outer peripheral end surface of the dummy resin frame member.

11. The apparatus for producing the dummy cell according to claim 9, wherein the limitation projection is detachably attached to the upper plate.

\* \* \* \* \*